US010698721B2

(12) United States Patent
Sethuramalingam et al.

(10) Patent No.: US 10,698,721 B2
(45) Date of Patent: *Jun. 30, 2020

(54) VIRTUAL MACHINE MIGRATION

(71) Applicant: Amazon Technologies, Inc., Seattle, WA (US)

(72) Inventors: Ekanth Sethuramalingam, Milpitas, CA (US); Suk Won Kim, Palo Alto, CA (US); John Merrill Phillips, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,097

(22) Filed: Nov. 16, 2018

(65) Prior Publication Data

US 2019/0102215 A1 Apr. 4, 2019

Related U.S. Application Data

(63) Continuation of application No. 15/087,765, filed on Mar. 31, 2016, now Pat. No. 10,133,593.

(51) Int. Cl.
*G06F 9/455* (2018.01)
*G06F 9/4401* (2018.01)

(52) U.S. Cl.
CPC ........ *G06F 9/45558* (2013.01); *G06F 9/4401* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,143,307 | B1 * | 11/2006 | Witte | G06F 11/1435 714/6.23 |
| 7,890,689 | B2 * | 2/2011 | Lam | G06F 9/44505 711/118 |
| 7,925,749 | B1 * | 4/2011 | Lin | G06F 16/119 709/225 |

(Continued)

OTHER PUBLICATIONS

U.S. Appl. No. 15/087,758, filed Mar. 31, 2016, Ekanth Sethuramalingam.

*Primary Examiner* — Hiren P Patel
(74) *Attorney, Agent, or Firm* — Robert C. Kowert; Kowert, Hood, Munyon, Rankin & Goetzel, P.C.

(57) ABSTRACT

Migrating servers from client networks to virtual machines (VMs) on a provider network. A migration appliance is installed or booted on the client network, and a migration initiator is instantiated on the provider network. A VM and associated volumes are instantiated on the provider network. The initiator sends a request for a boot sector to the appliance; the appliance reads the blocks from a volume on the client network, converts the blocks to a format used by the VM, and sends the blocks to the initiator. The initiator boots the VM using the boot sector and the VM begins execution. The initiator then retrieves all data blocks for the VM from volumes on the client network via the appliance, stores the data to the volumes on the provider network, and fulfills requests from the VM from either local volumes or the remote volumes via the appliance.

20 Claims, 23 Drawing Sheets

(56) References Cited

U.S. PATENT DOCUMENTS

| | | | |
|---|---|---|---|
| 8,060,703 B1* | 11/2011 | Desai | G06F 12/023 711/147 |
| 8,196,138 B2* | 6/2012 | Allwell | G06F 9/461 718/1 |
| 8,874,888 B1 | 10/2014 | Beda, III et al. | |
| 8,949,162 B1 | 2/2015 | Pillay | |
| 9,086,892 B2* | 7/2015 | Fontignie | G06F 9/4401 |
| 9,218,197 B2 | 12/2015 | Balani et al. | |
| 9,348,646 B1 | 5/2016 | Daya et al. | |
| 9,715,400 B1 | 7/2017 | Sethuramalingam et al. | |
| 9,778,952 B1 | 10/2017 | Sutton et al. | |
| 9,811,365 B2 | 11/2017 | Borthakur | |
| 9,811,431 B1 | 11/2017 | Natanzon et al. | |
| 9,979,694 B2 | 5/2018 | Brandwine et al. | |
| 10,013,274 B2* | 7/2018 | Coles | G06F 9/45558 |
| 10,127,066 B1* | 11/2018 | Sethuramalingam | G06F 9/45558 718/1 |
| 10,133,593 B1 | 11/2018 | Sethuramalingam et al. | |
| 10,228,964 B2* | 3/2019 | CaraDonna | G06F 9/45558 |
| 2006/0010176 A1 | 1/2006 | Armington | |
| 2006/0075400 A1* | 4/2006 | Jarvis | G06F 8/63 717/174 |
| 2007/0260831 A1* | 11/2007 | Michael | G06F 9/4401 711/162 |
| 2008/0155223 A1* | 6/2008 | Hiltgen | G06F 9/45558 711/173 |
| 2008/0162604 A1 | 7/2008 | Soulet et al. | |
| 2009/0138877 A1* | 5/2009 | Fitzgerald | G06F 21/52 718/1 |
| 2011/0238969 A1 | 9/2011 | Warkentin et al. | |
| 2012/0060153 A1* | 3/2012 | Bealkowski | G06F 9/45558 718/1 |
| 2012/0110237 A1* | 5/2012 | Li | G06F 9/45558 711/6 |
| 2012/0151476 A1* | 6/2012 | Vincent | G06F 9/45558 718/1 |
| 2012/0278571 A1* | 11/2012 | Fleming | G06F 9/455 711/162 |
| 2013/0219161 A1 | 8/2013 | Fontignie et al. | |
| 2013/0262390 A1 | 10/2013 | Kumarasamy et al. | |
| 2013/0262801 A1 | 10/2013 | Sancheti et al. | |
| 2013/0283364 A1 | 10/2013 | Chang et al. | |
| 2014/0007100 A1 | 1/2014 | Gu et al. | |
| 2014/0033201 A1 | 1/2014 | Dawkins et al. | |
| 2014/0040886 A1* | 2/2014 | Coles | G06F 9/4401 718/1 |
| 2014/0366155 A1 | 12/2014 | Chang et al. | |
| 2015/0135174 A1* | 5/2015 | Bonzini | G06F 9/45558 718/1 |
| 2015/0178128 A1 | 6/2015 | Knowles et al. | |
| 2015/0212844 A1 | 7/2015 | Tsirkin et al. | |
| 2015/0242159 A1 | 8/2015 | Tsirkin | |
| 2015/0261581 A1 | 9/2015 | Wang | |
| 2015/0309839 A1 | 10/2015 | Lu | |
| 2015/0324227 A1 | 11/2015 | Sizemore | |
| 2015/0331709 A1 | 11/2015 | Agrawal et al. | |
| 2015/0339150 A1 | 11/2015 | Yanagisawa et al. | |
| 2015/0339156 A1 | 11/2015 | Vincent et al. | |
| 2015/0355924 A1 | 12/2015 | Holla et al. | |
| 2016/0026489 A1* | 1/2016 | Maislos | G06F 9/45558 718/1 |
| 2016/0028624 A1 | 1/2016 | Song et al. | |
| 2016/0034302 A1 | 2/2016 | Fries et al. | |
| 2016/0098302 A1 | 4/2016 | Ben-Yehuda et al. | |
| 2016/0105321 A1 | 4/2016 | Thakkar et al. | |
| 2016/0154664 A1 | 6/2016 | Iwamatsu | |
| 2016/0188353 A1 | 6/2016 | Shu et al. | |
| 2016/0226489 A1 | 8/2016 | Morita | |
| 2016/0283513 A1 | 9/2016 | Antony | |
| 2016/0335108 A1* | 11/2016 | Ryu | G06F 9/45558 |
| 2017/0060628 A1* | 3/2017 | Tarasuk-Levin | G06F 9/4856 |
| 2017/0142202 A1 | 5/2017 | Chen | |
| 2017/0147501 A1 | 5/2017 | Tsirkin et al. | |
| 2017/0177840 A1 | 6/2017 | Srivastava et al. | |

* cited by examiner

VIRTUAL MACHINE MIGRATION

This application is a continuation of U.S. patent application Ser. No. 15/087,765, filed Mar. 31, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
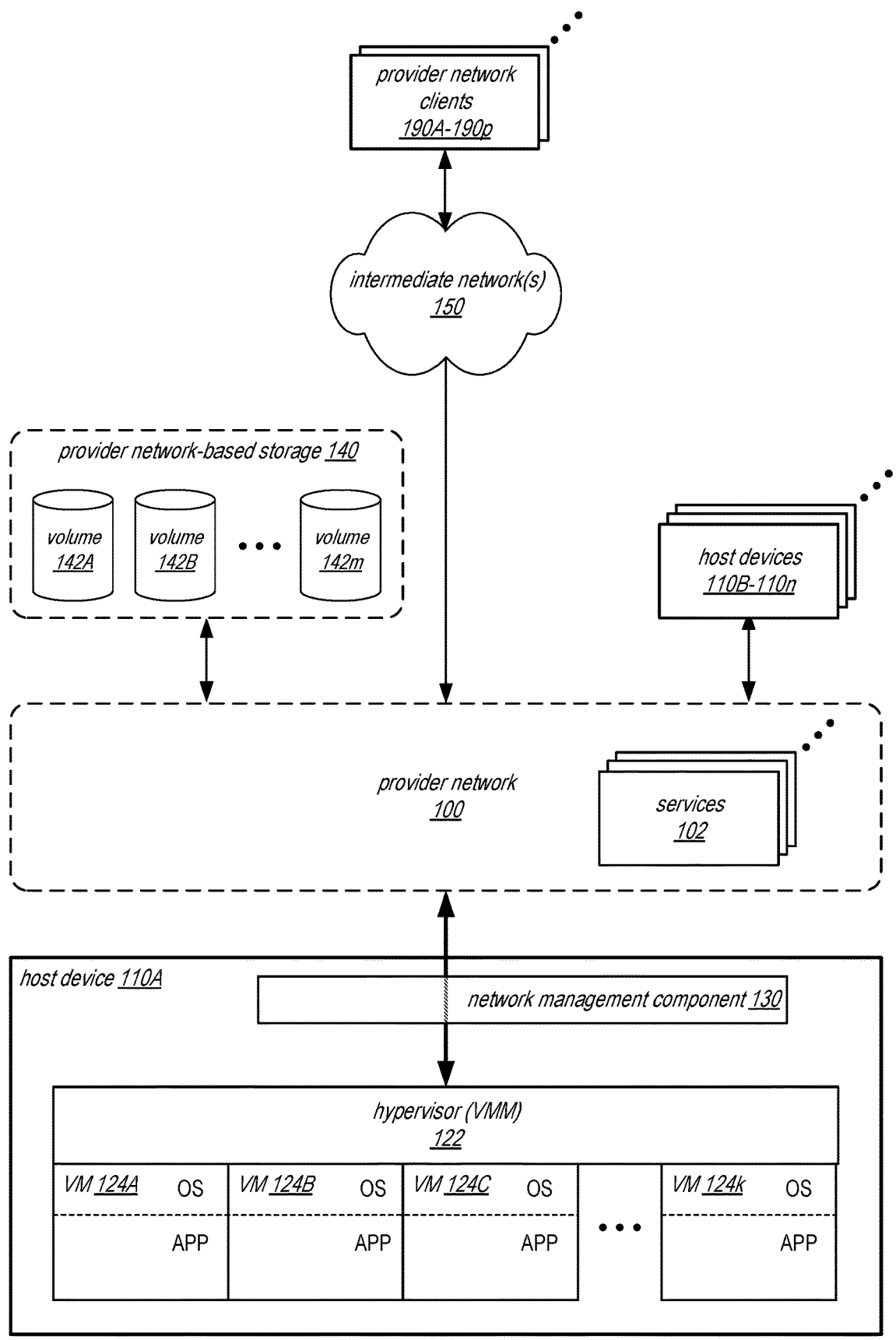
FIG. 1 illustrates an example provider network environment in which embodiments of the methods and apparatus for migrating virtual machines (VMs) in provider network environments may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for migrating servers (e.g., virtual machines (VMs) on host devices or physical devices) from client networks to VMs on a provider network are described. The migration methods and apparatus allow a server being migrated from a customer's data center to the provider network to be made almost immediately available on the provider network after the migration is initiated without having to wait until the entire server is uploaded from the client network to start the VM on the provider network. Thus, downtime for the server and its applications may be significantly reduced or minimized in the migration process.

Conventionally, to migrate a server from a client network to a provider network, all of the server's data including operating system (OS) data and application data, stored as one or more volumes (e.g., one or more virtual or physical disks) on the client network, is copied or moved to volume(s) in storage on the provider network over an intermediate network such as the Internet to create a machine image in storage on the provider network. Once all of the data is present in storage on the provider network, the machine image can be used to instantiate and boot a VM in a virtualization environment on a host device in the provider network, and attach the VM to the volume(s) in storage. However, copying all of the data can take a considerable amount of time, as gigabytes or even terabytes of data may need to be transferred over the intermediate network.

Using embodiments of the methods and apparatus for migrating servers from client networks to virtual machines as described herein, instead of waiting for all of the server's data to be copied to the provider network to instantiate and boot a VM on the provider network, to prepare for a migration, a "shell" VM may be instantiated on a host device on the provider network, and one or more empty volumes may be instantiated on storage of the provider network. When the migration is initiated, a boot sector (e.g., the first N bytes at an offset in a volume) may be fetched from storage on the client network over a network connection and used to boot the VM; the boot sector may also be stored to the volume(s) on the provider network. As the VM boots, data (e.g., OS data) requested by the VM may be fetched from the storage on the client network over the network connection, provided to the VM, and also stored to the volume(s) on the provider network. Additional data (e.g., OS and/or application data) may be proactively fetched from the client network and stored to the volume(s) on the provider network. As the VM executes, additional data may be requested; the requests may be filled from the volume(s) on the provider network if the requested data has already been fetched, or from the volume(s) on the client network if the requested data has not been fetched.

In some embodiments, to perform a migration of a server from a client network to the provider network, a migration appliance is installed on the client network, a migration initiator is instantiated on the provider network, and a network connection is established between the migration initiator and the migration appliance. A "shell" VM of an appropriate type (e.g., a small, medium, or large instance, where each type may have different combinations or different types of memory, CPU, bandwidth, storage, etc.) is instantiated on a host device in the provider network, and associated volumes are instantiated in a storage service or subsystem of the provider network. The server to be migrated is shut down on the client network. To start the migration, a boot of the VM instance on the host device in the provider network is initiated. The migration initiator sends a request for a boot sector (e.g., an offset and a number of blocks or bytes) to the migration appliance; the migration appliance reads the boot sector from a volume on the client network and sends the blocks to the migration initiator, converting the boot sector to a format used on the provider network if necessary. The migration initiator boots the VM on the host device in the provider network using the boot sector, and the VM completes the boot process and begins execution. The migration initiator then fetches all data blocks for the VM from volumes on the client network via the migration appliance (e.g., in response to requests for data generated by read/write operations of the VM, or proactively), stores the fetched blocks to the volumes on the provider network, and fulfills read/write operations from the VM from either the local volumes if the data is present or from the remote volumes via the migration appliance if the requested data has not been migrated.

In some embodiments, the data may be stored in the volumes in storage of the client network in blocks of a format that is different from a block format used by the storage service on the provider network. In these embodiments, the migration appliance may first convert blocks read from the volume(s) on the client network to the format used by the storage service on the provider network before sending the blocks over the connection to the migration initiator.

In some embodiments, the migration initiator handles write operations from the VM by applying the writes to the volume(s) on the provider network. In some embodiments, if a block that is the target of a write has not been migrated, the block is fetched from the volume(s) on the client network prior to the write. In some embodiments, a writethrough mode may be enabled in which the write requests are mirrored to the migration appliance on the client network, which then applies the writes to the volume(s) on the client network. By mirroring the writes to the volume(s) on the client network, in case of migration failure or for other reasons, the server can be rapidly restarted on the client network in an up-to-date state.

In some embodiments, one or more duplicate volumes for a server (e.g., duplicate volumes associate with the same customer of the provider network, other customers, or the provider network may store standard or "vanilla" versions of operating systems) may be uploaded to the provider network prior to migrating the server, and fingerprints (e.g., hashes) of the blocks in the duplicate volumes may be generated. For read or write operations from the VM directed to blocks in the volume(s) that have not been migrated, the migration initiator may send requests for fingerprints of the blocks to the migration appliance on the client network. The migration appliance returns the fingerprints of the blocks in the volumes on the client network. The migration initiator checks the fingerprints of the blocks in the duplicate volumes against the fingerprints of the blocks as stored on the client network. For fingerprint matches, the migration initiator retrieves the blocks from the duplicate volume(s), fulfills the read/write operations, and writes the blocks to the volumes on the provider network to which the server's data is being migrated. For fingerprint misses, the migration initiator sends requests for the blocks to the migration appliance, which returns the blocks from the volumes on the client network. The migration initiator fulfills the read/write operations, and writes the blocks to the volumes on the provider network to which the server's data is being migrated.

Embodiments of the methods and apparatus for migrating servers in provider network environments may, for example, be implemented in the context of a service provider that provides to clients or customers, via an intermediate network such as the Internet, virtualized resources (e.g., virtualized computing and storage resources) implemented on a provider network of the service provider, typically in a data center (or data centers) of the service provider. FIG. 1 illustrate an example provider network environment in which embodiments of the methods and apparatus for migrating virtual machine instances in provider network environments may be implemented. FIGS. 13 through 16 and the section titled Example provider network environments further illustrate and describe example service provider network environments in which embodiments of the methods and apparatus as described herein may be implemented.

FIG. 1 illustrates a provider network environment in which embodiments of the methods and apparatus for migrating virtual machines may be implemented, according to some embodiments. As shown in FIG. 1, provider network clients 190A-190p may access one or more services 102 of the provider network 100 via intermediate network(s) 150 (e.g., the Internet) to configure and manage resource instances, for example virtual machines (VMs) 124 on host device(s) 110A-110n, on the provider network 100. At least some of the resource instances on a provider network 100 may be implemented according to hardware virtualization technology that enables multiple operating systems to run concurrently on a host device 110, i.e. as VMs 124 on a host device 110. A hypervisor 122, or virtual machine monitor (VMM), on the host device 110 presents the VMs 124 on the respective host device 110 with a virtual platform and monitors the execution of the VMs 142 on the respective host device 110. Each VM 124 may be provided with one or more IP addresses; the VMM 122 on a respective host device 110 may be aware of the IP addresses of the VMs 124 on the host.

In some embodiments, VMs 124 on a host device 110 may include virtualized computing resources of a client 190 implemented on multi-tenant hardware that is shared with other clients 190. The clients' traffic may be handled and routed to and from the clients' respective VMs 124 on the host device 110 by a network management component 130 of the host device 110. While FIG. 1 shows network management component 130 communicating with VMs 124A via hypervisor 122, in some embodiments a network management component 130 may communicate directly with a VM 124 on the respective host device 110.

Figure 17:
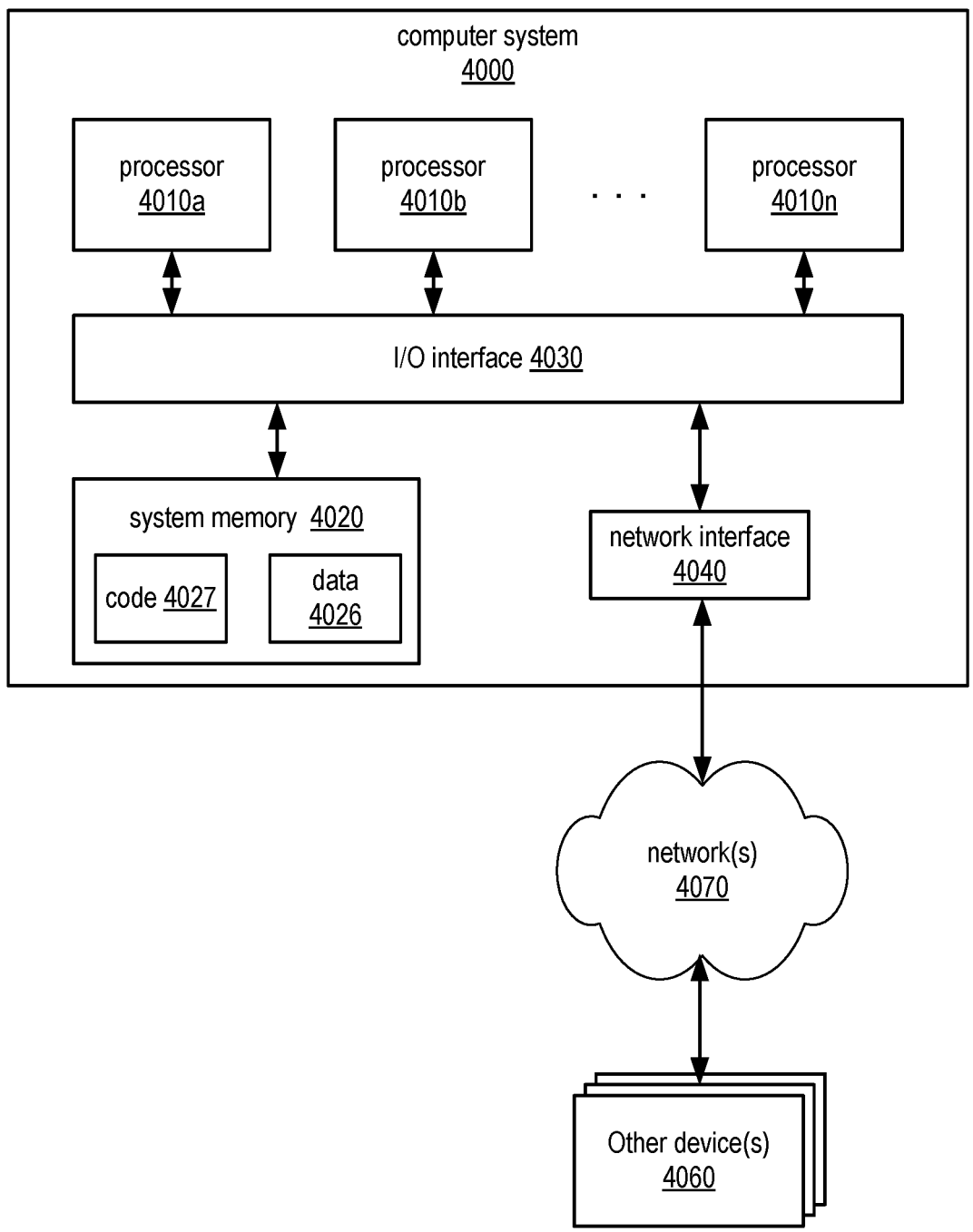
FIG. 17 is a block diagram illustrating an example computer system that may be used in some embodiments.

In some embodiments, the VMs 124 (e.g., VMs 124A-124k on example host device 110A) may be assigned network virtual addresses within an address space; the network virtual addresses may be portable addresses that can be mapped or remapped to other endpoints (e.g., other VMs 124) on the provider network 100. Packets sent from the VMs 124 may be encapsulated by a network management component 130 of the respective host device 110 and routed to their destinations via the provider network 100. Packets sent to the VMs 124 on a host device 110 may be decapsulated by the network management component 130 of the respective host device 110 and provided to respective VMs 124. FIG. 17 shows an example system that may be used as a host device 110 in some embodiments. In some embodiments, host devices 110A-110n may be or may include rack-mounted devices (e.g., rack-mounted server devices), with multiple racks in a data center that implements the provider network 100 each including one or more of the host devices 110A-110n and possibly other rack- and network-related hardware.

In some embodiments, the host devices 110 on the provider network 100 may implement VMs 124. While not shown, at least some of the host devices 110 may also provide local persistent storage for data of the VMs 124, with each VM/domain instantiated on a host device 110 (e.g., host device 110A) allocated a portion of the local persistent storage on the host device 110, for example 1 gigabyte (gB), 5 gB, etc. A hypervisor 122, or virtual machine monitor (VMM) on a host device 110 (e.g., host device 110A) may manage the VMs/domains on the respective device. Each VM/domain and its local storage allocation occupies a slot on the respective host device 110. A host device 110 may have a fixed number of slots (e.g., 8, 10, or more), with slots that are currently allocated to or reserved for a domain referred to as occupied or unavailable slots, and slots that are not allocated to or reserved for a domain referred to as unoccupied, free, or available slots.

In at least some embodiments, at least some of the VMs 124 on a host device 110 may be attached to one or more shared network-based storage 140 systems or devices, for example via one or more virtual storage services 102 offered by the provider network 100. At least some data associated with and accessed by application(s) on a given VM 124 may be stored in or as one or more volumes 142 in the attached network-based storage 140. Note that the network-based storage 140 is separate from the local persistent storage that may be provided by a host device 110, and that a VM/domain is not necessarily attached to network-based storage 140. In some embodiments, other content may also be stored for clients 190 in the network-based storage 140 systems, for example machine images that may be used to instantiate VM 124 instances on host systems 110A-110n.

As shown in the example host device 110A of FIG. 1, a VM 124 may include an operating system (OS) portion (e.g. a boot sector and OS-related data) and an application (APP) portion. A VM's OS may be any type of operating system that is supported in virtualized environments, for example any of various Linux or Microsoft Windows® operating systems. A VM's application portion may implement any type of provider network-based application or applications for a respective client 190, for example various server applications, database applications, and so on.

In some embodiments, a service provider that provides a provider network 100 for clients 190 may provide one or more services 102 and application programming interfaces (APIs) that allow clients 190 to establish and manage resources in client implementations on the provider network 100 including but not limited to client private networks implementations on the provider network. A private network in a provider network environment may be broadly defined as a network space (e.g., logically defined by an address range or address space) that contains a set of provider network resources of a respective client 190, and that acts as a logically isolated section on the provider network 100 for the client 190's resources. A private network may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a private network may be assigned IP addresses (e.g., 32-bit IPv4 addresses) within the private network's address space. A client 190's implementation, for example a private network, on the provider network 100 includes the client 190's resource instances, such as VMs 124 on host devices 110 configured as virtual computing resource instances by the client 190 and volumes 142 on provider network-based storage 140 associated with the client 190's VMs 142.

FIGS. 2A through 2F are block diagrams that graphically illustrate methods and apparatus for migrating VMs from client networks to a provider network, according to some embodiments. As shown in FIGS. 2A through 2F, a client network 270 may be implemented in a customer's data center (DC). One or more hosts 280 in the client network 270 may each implement one or more servers as virtual machines (VMs) 284 in a virtualization environment under control of a hypervisor 282. Example virtualization environments and hypervisors include, but are not limited to, Hyper-V and Xen technology virtualization environments and hypervisors. Each VM 284 may implement an operating system (OS) supported by the virtualization environment, for example any of various Linux or Microsoft Windows® operating systems, and one or more applications (APP). Each VM 284 may be logically attached to one or more virtualized disks or volumes 292 in storage 290 of the client network 270. For example, VM 284A may be attached to volume(s) 292A, and VM 284B may be attached to volume(s) 292B. The volumes 292 may be stored according to any of various formats, for example VHD (Virtual Hard Disk) format, VMDK (Virtual Machine Disk) format, and so on. The volume(s) 292 for a given VM 284 may include at least the data for the OS on the VM 284 and the data for application(s) on the VM 284.

Systems on the client network 270 may communicate with systems on a provider network 200 via an intermediate network 250 such as the Internet. The provider network 240 may include storage 240, for example implemented by one or more virtualized storage services that provide different types of virtualized storage to customers of the provider network 240 (with a block-based, multitenant, distributed storage service as one example). In some embodiments, the storage service(s) may store virtualized disks or volumes for customers in proprietary format(s). A customer may establish a private network on the provider network; for example, the customer associated with client network 270 may establish a client private network 220 on the provider network 200. The client private network 220 may be defined as a network space (e.g., logically defined by an address range or address space) that contains a set of provider network resources (e.g., VMs, virtualized disks or volumes, etc.) of the customer, and that acts as a logically isolated section on the provider network 200 for the customer's resources.

Figure 2A:
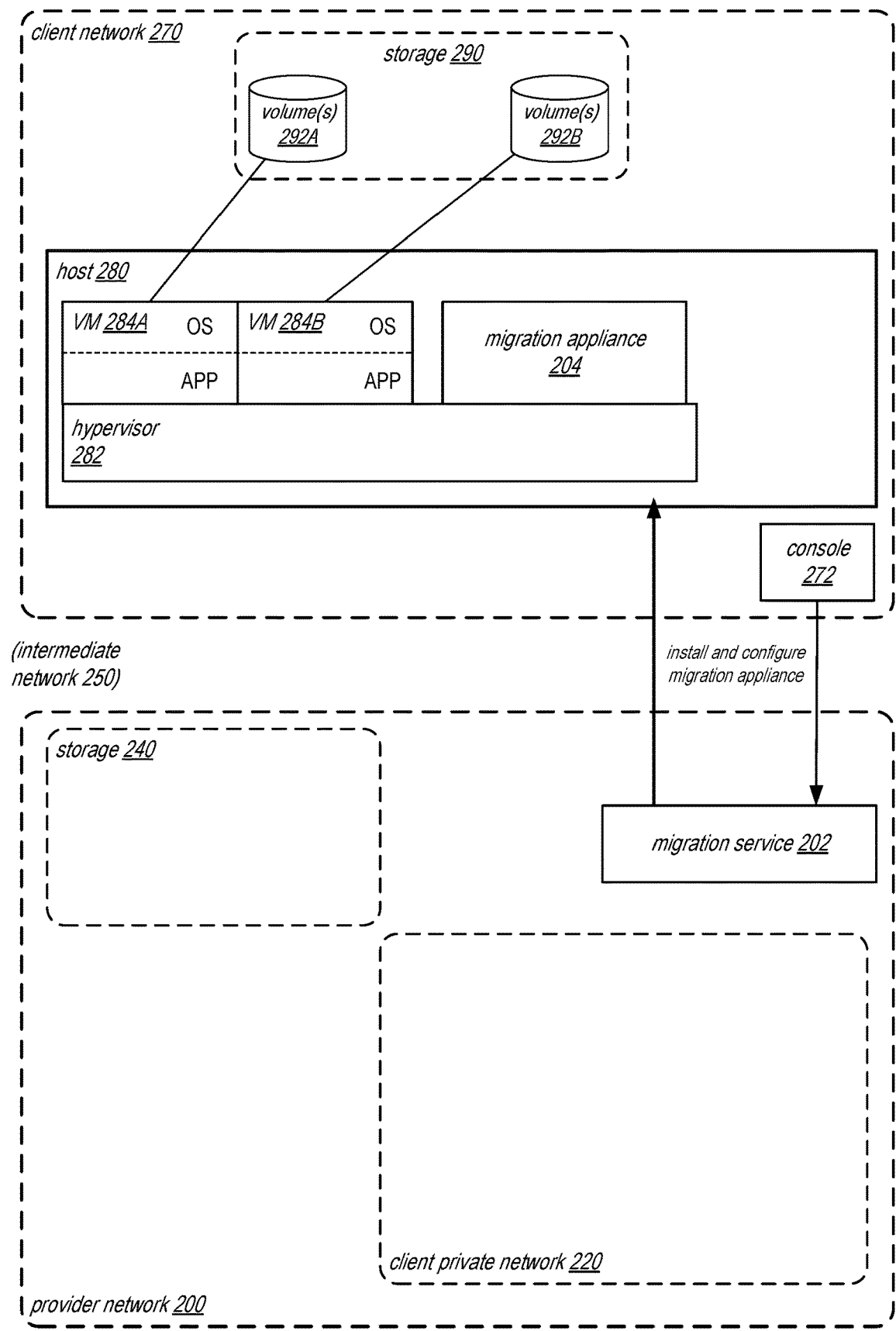
FIGS. 2A through 2F are block diagrams that graphically illustrate methods and apparatus for migrating VMs from client networks to a provider network, according to some embodiments.
Figure 12:
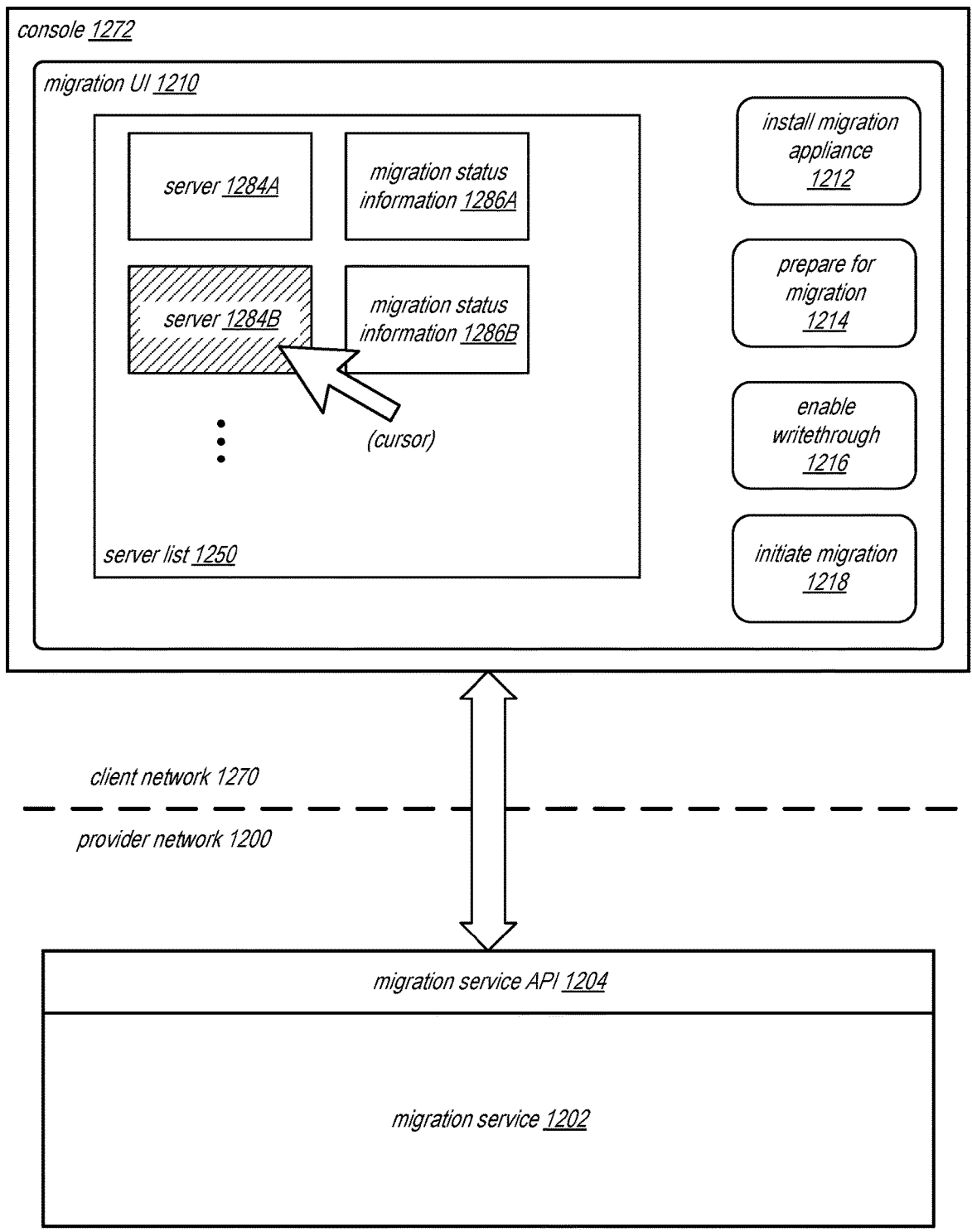
FIG. 12 shows an example user interface to the migration service, according to some embodiments.

FIG. 2A illustrates installing and configuring a migration appliance 204 in a client network 270, according to some embodiments. As shown in FIG. 2A, a migration service 202 may be implemented by one or more devices in the provider network 200. The migration service 202 may provide an application programming interface (API) and user interface(s) that allow customers to migrate servers (e.g., VMs 284) from their client networks 270 to VMs in the private network 220 implementations on the provider network 200. FIG. 12 shows an example user interface to the migration service 202, according to some embodiments. A customer may access the migration service 202 from a console 272 in their client network 270.

As shown in FIG. 2A, the customer associated with client network 270 may access the migration service 202 from console 272 to install and configure a migration appliance 204 on the client network 270, for example via a user interface as illustrated in FIG. 12. As shown in FIG. 2A, in some embodiments the migration appliance 204 may be installed as a VM in the virtualization environment on a host 280 from which one or more VMs 284 are to be migrated to the provider network 200. However, in some embodiments, the migration appliance 204 may be installed on the host 280 external to the virtualization environment, or may be installed on the client network 270 on a device external to the host 280.

Figure 2B:
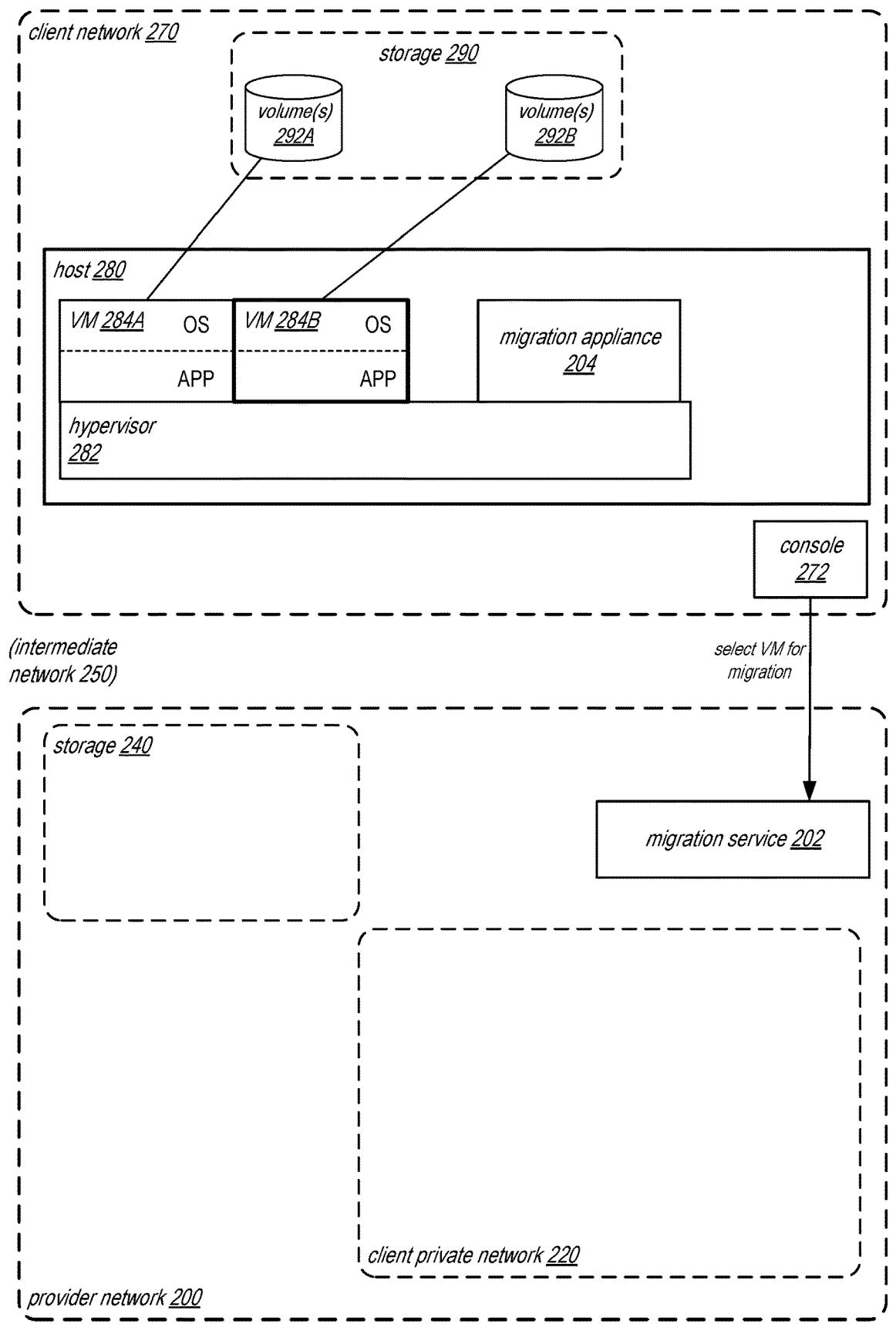

FIG. 2B illustrates selecting a VM 284 in the client network 270 for migration, according to some embodiments. As shown in FIG. 2B, the customer may access the migration service 202 from console 272 to select a VM 284 (VM 284B, in this example) on host 280 for migration, for example via a user interface as illustrated in FIG. 12. While not shown in FIG. 2B, in some embodiments, the customer may select multiple VMs 284 for migration, and the migrations may be performed substantially in parallel.

Figure 2C:
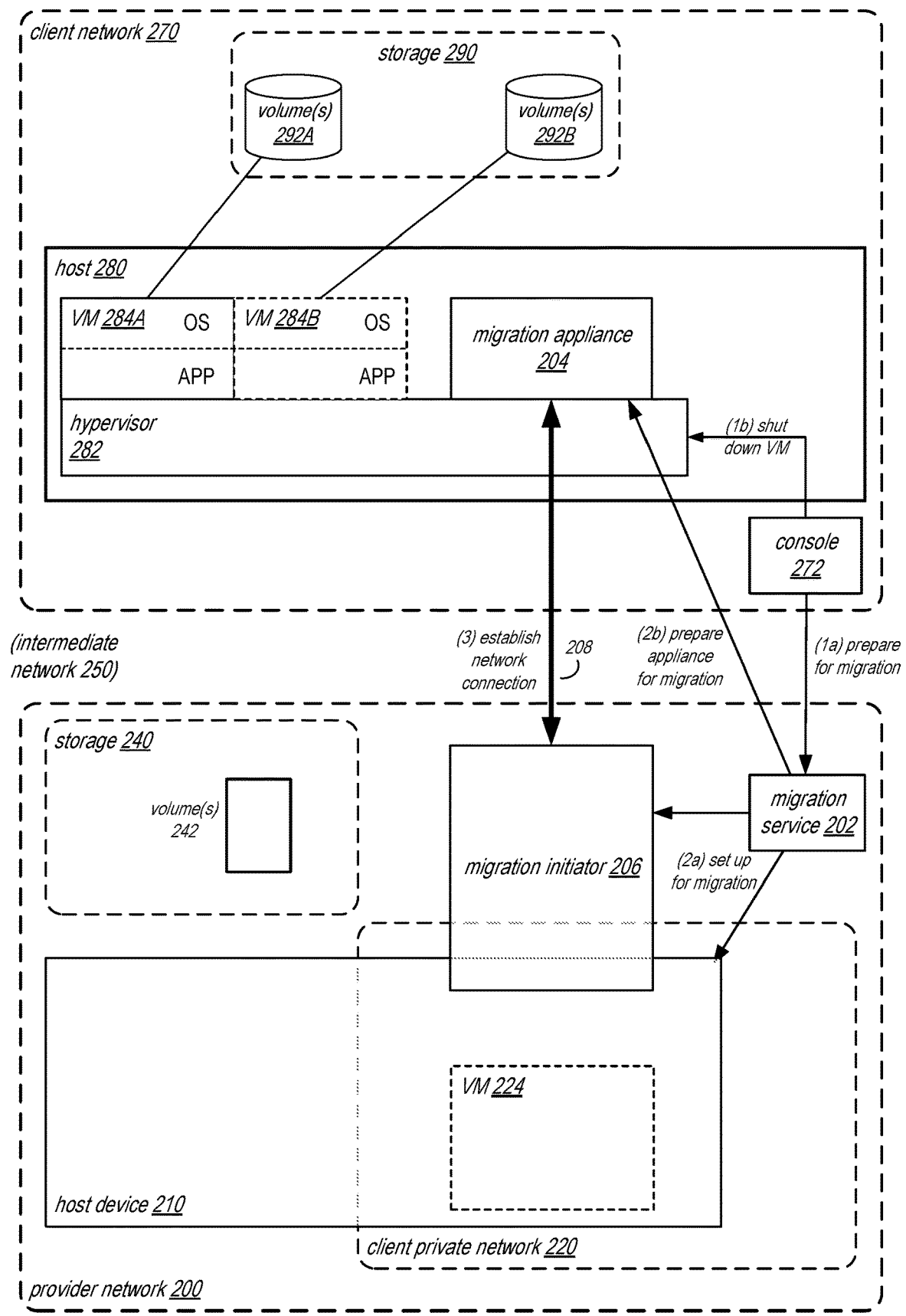

FIG. 2C illustrates preparing to migrate the selected VM 284B in the client network 270 to the provider network 200, according to some embodiments. At (1a) of FIG. 2C, the customer may access the migration service 202 from console 272 to prepare to migrate the selected VM 284 (VM 284B, in this example) on host 280 to the provider network 200, for example via a user interface as illustrated in FIG. 12. At (1b) of FIG. 2C, the customer may shut down the VM 284B on the client network 270. Note that the customer may instead shut down the VM 284 prior to directing the migration service 202 to prepare for migration. Also note that, in some embodiments, the preparation process shown in FIG. 2C may be initiated by the selection in FIG. 2B.

In some embodiments, to prepare for the migration, at (2a) of FIG. 2C the migration service 202 may direct a host device 210 on the provider network to instantiate a VM 224 shell in a slot in the virtualization environment on the host 210. In some embodiments, VM instantiation and support may be provided by one or more virtualization services on the provider network 200, for example as illustrated in FIGS. 13 through 16, and the migration service 202 may communicate with a virtualization service to instantiate the VM 224 shell on the host device. Note that there may be two or more different types of VMs (e.g., VM types that support different operating system environments, different levels of provider network bandwidth, different types or sizes of volumes, etc.) that can be instantiated on the provider network, and the migration service 202 may indicate which VM type is to be initiated. Initially, the VM 224 is not running.

Figure 4A:
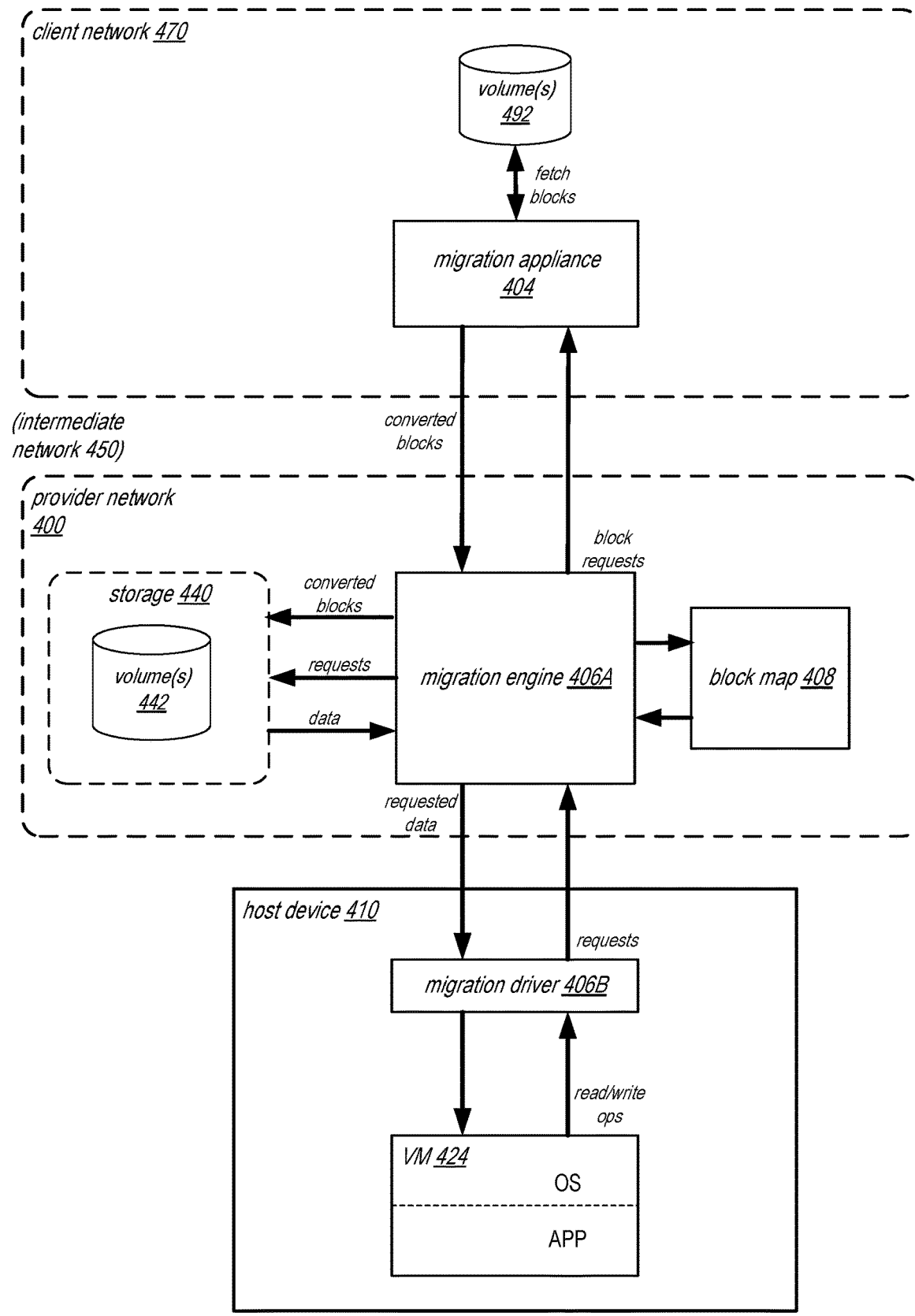
FIG. 4A is a block diagram that graphically illustrates components and operations of a migration initiator in a provider network, according to some embodiments.

At (2a) of FIG. 2C, the migration service 202 also instantiates a migration initiator 206 for the migration. In some embodiments, the migration initiator 206 may be instantiated as a process on the host device 210 on which the VM 224 is instantiated. In some embodiments, the migration initiator may include a migration driver component and a migration engine component, with the migration driver instantiated on the host device 210 and the migration engine instantiated on a device on the provider network 200 and external to the host device 210, for example as illustrated in FIGS. 4 and 5.

At (2b) of FIG. 2C, the migration service 202 directs the migration appliance 204 to prepare for migrating VM 284B to the VM 224 on the provider network vial migration initiator 206. In some embodiments, preparing the migration appliance 204 for the migration may include the migration appliance 204 collecting information about the VM 284B to be migrated, for example OS type of the VM 284B, location of the volume(s) 292B, format of the volume(s) 292B, volume maps, location and size of the boot sector for the VM 284B, and so on.

At (3) of FIG. 2C, a connection 208 is established between the migration appliance 204 and the migration initiator 206 over the intermediate network 250. In some embodiments, the network connection 208 may be a high-bandwidth, secure connection, for example according to a secure communication protocol such as HTTPS. In some embodiments, the migration appliance 208 may obtain an indication of an encryption protocol from the client to use, for example a client-specific key-based encryption protocol, which may be used on the connection 208 for communications with and data transfers to the migration initiator 206.

In some embodiments, at least some of the information about the VM 284B to be migrated that is collected by the migration appliance 204 at (2b) may be provided to the migration service 202 and/or to the migration initiator 206 via the connection 208 or via the migration service 202. In some embodiments, the migration service 202 may display at least some of the information via a user interface on console 272, for example as illustrated in FIG. 12.

Figure 2D:
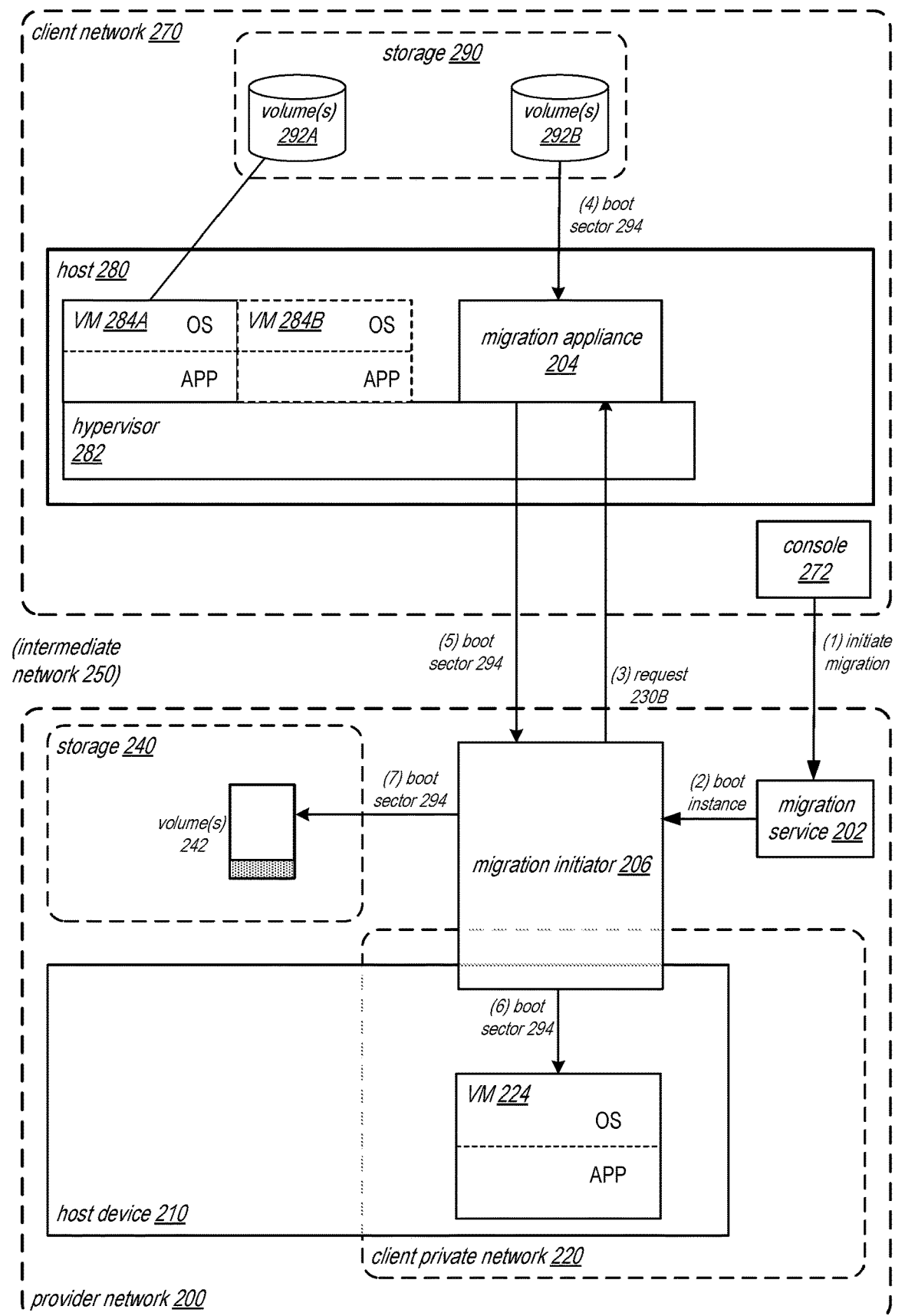

FIG. 2D illustrates initiating the migration and booting the VM 224 on the provider network 200, according to some embodiments. At (1), the customer directs the migration service 202 to initiate the migration, for example via a user interface as illustrated in FIG. 12. At (2), the migration service 202 directs the migration initiator 206 to boot the VM 224. To boot the VM 224 on the provider network 200, the migration initiator 206 fetches the boot sector 294 for the VM 284B that is being migrated from a volume 294 on client network storage 290 via the migration appliance 204. At (3), the migration initiator 206 sends a request over connection 208 to the migration appliance 204 indicating the location and size (e.g., byte offset and number of bytes) of the boot sector 294 in the volume(s) 292B. At (4), the migration appliance 204 reads the boot sector 294 from the volume(s) 292B. At (5), the migration appliance sends the boot sector 294 to the migration initiator 206 over the connection 208. In some embodiments, if necessary, the migration appliance 204 converts the boot sector 294 to a format used on the provider network 200 before sending the boot sector 294 to the migration initiator 206. In some embodiments, the migration appliance 204 encrypts and/or compresses the boot sector before sending the boot sector 294 to the migration initiator 206. At (6), the VM 224 is booted on the host 210 in the provider network 200 using the boot sector 294 obtained from the client network 270. At (7), the boot sector 294 may be written to the appropriate location in the volume(s) 242 on the provider network 200.

In some embodiments, a user interface to the migration service 202 displayed on the console 272, for example as illustrated in FIG. 12, may be updated to reflect the current status of the migration during the migration initiation process of FIG. 2D.

Figure 2E:
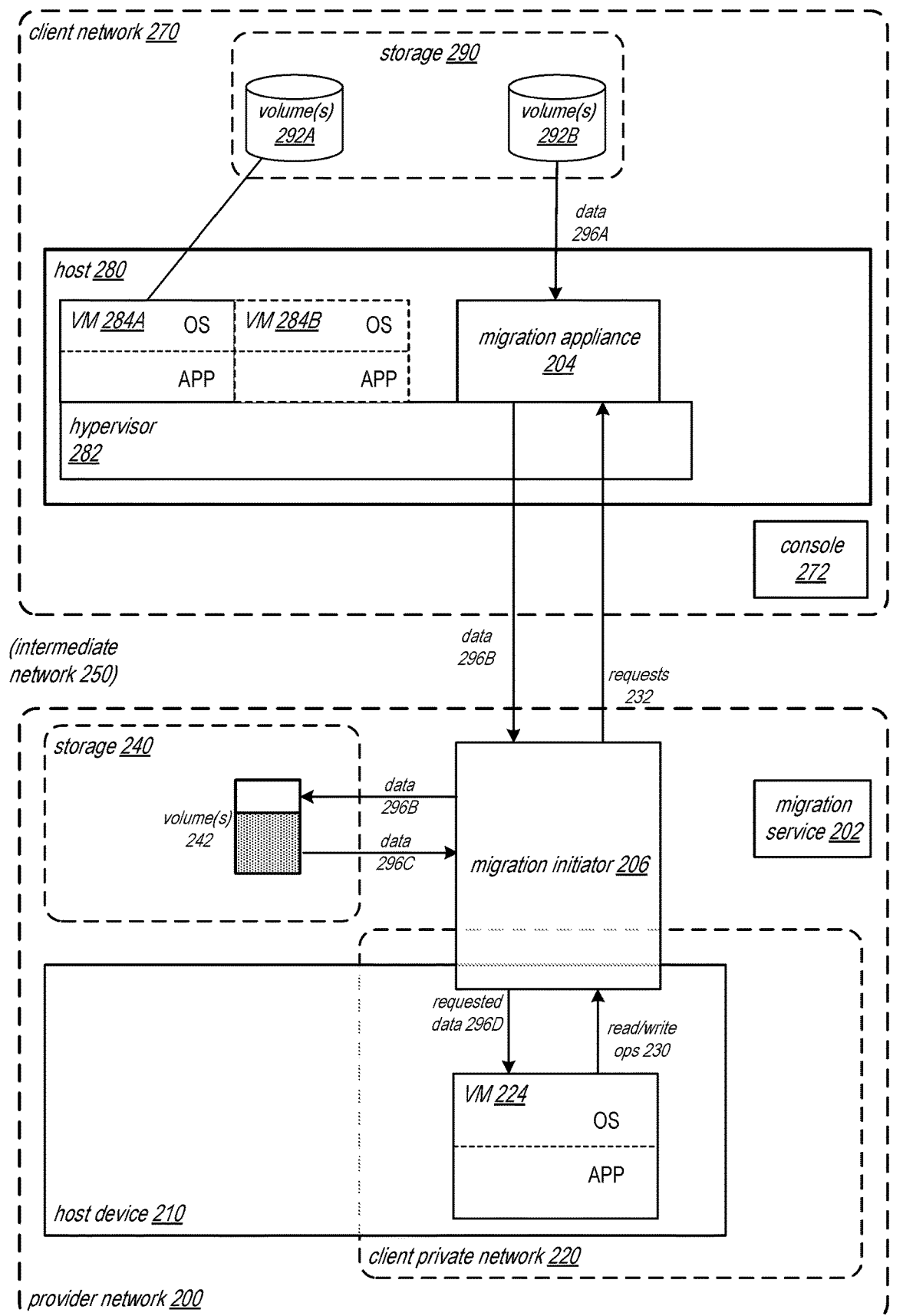

FIG. 2E illustrates migrating the data for the VM 224 on the provider network 200 from the client network 270, according to some embodiments. After booting from the boot sector 294 as shown in FIG. 2D, the VM 224 begins execution, and begins generating read and write operations 230, for example to read OS data during a boot process for the OS, and to read and write application data. The migration initiator 206 receives (e.g., intercepts) the read and write operations.

For read operations, the migration initiator 206 first checks to determine if the required data has been migrated to the volume(s) 242 on the provider network. If so, the data 296C is read from the volume(s) 242 and provided as data 296D to the VM 224. If not, the migration initiator 206 sends request(s) 232 to the migration appliance 204 for at least the requested data. The migration appliance 204 gets the requested data 296A from the volume(s) 292B and sends the data 296B to the migration initiator 206, converting the data 296A to a format used on the provider network 200 if necessary. The migration initiator 206 provides data 296D to the VM 224 to satisfy the request, and writes the data 296B to the volume(s) 242.

For write operations 230, the migration initiator 206 intercepts the writes and writes the data indicated by the write operations to the locations (e.g., blocks) indicated by the write operations. Before writing the data to the blocks, the migration initiator 206 first determines if the blocks that are targeted by the writes have been migrated to the volume(s) 242. If not, the migration initiator fetches the blocks from the volume(s) 292 on the client network 270 via the migration appliance 204 and stores the blocks to the volume(s) 242 on the provider network 200 prior to performing the write. In some embodiments, if writethrough is enabled, the migration initiator 206 mirrors the write operations to the migration appliance 204, which performs the writes to the indicated blocks in the volume(s) 292B.

In some embodiments, requests 232 for data that are made for read and/or write operations may specify some number N of blocks. In some embodiments, to utilize available throughput on the network connection 208 efficiently, the migration initiator 206 determines N according to characteristics of the network connection 208 including bandwidth of the connection and latency on the connection. For example, the migration initiator 206 may monitor latency on the network connection 208 for fulfilling read requests 232 to the migration appliance 204, and may determine a number of bytes that can be transferred over the network connection 208 in that amount of time according to the bandwidth of the connection 208. The migration initiator 206 may then determine N (the number of blocks to be fetched in a request 232) as a function of the latency and the bandwidth to utilize the available throughput on the network connection 208 when requesting blocks for read or write operations. Note that, for blocks that have already been migrated, the migration initiator 206 may fulfill the request from the volume(s) 242 on the provider network.

In some embodiments, the migration initiator 206 may perform preemptive block migration continuously in the background during the migration process to preemptively migrate blocks from the volume(s) 292 on the client network 270 to the volume(s) 242 on the provider network 200 when bandwidth is available on the network connection 208 between the migration appliance 204 and the migration initiator 206. In some embodiments, the migration initiator 206 determines sets of blocks to be migrated from the volume(s) 292 on the client network 270 to the volume(s) 242 in the storage subsystem 240 on the provider network 200. The migration initiator 206 sends requests 232 for the sets of blocks to the migration appliance 204 on the client network 270 over the connection 208. The migration appliance 204 reads the blocks (as data 296A) from the volume(s) 292B on the client network 270, converts the blocks if necessary, and sends the converted blocks (as data 296B) to the migration initiator 206. The migration initiator 206 stores the blocks (as data 296B) to the local volume(s) 242.

In various embodiments, the migration initiator 206 may determine the sets of blocks to be preemptively migrated according to one or more methods. In some embodiments, the migration initiator 206 may maintain a block map for the volume(s) that indicates blocks that have been migrated and blocks that have not been migrated, for example as illustrated in FIG. 4A. To determine sets of blocks for migration, the migration initiator 206 may check the block map to locate sets of blocks that have not yet been migrated. In some embodiments, the migration initiator 206 may track the read and/or write operations 230 from the VM 224 on the host device 210 to blocks in the volume(s). To determine sets of blocks for migration, the migration initiator 206 may detect patterns in the tracked read and/or write operations 230 and, upon detecting a pattern, may determine the sets of blocks to be migrated according to the pattern. For example, a detected pattern may indicate two or more blocks that are accessed from the volume(s) in a sequence, and one or more sets of blocks may be selected for migration that include blocks that are ahead of the two or more blocks on the volume(s) in the sequence. As another example, a detected pattern may indicate a pattern used for accessing blocks from a boot volume during the boot process for the operating system (OS) of the VM 224, and one or more sets of blocks may be selected for migration that include blocks in the boot volume that are to be accessed according to the pattern during the boot process for the OS.

While not shown in FIG. 2E, in some embodiments, one or more duplicate volumes of the volumes 292B on the client network 270 or volumes containing the base version of the OS may be uploaded to the provider network 200 by the client, the provider, or other clients prior to migrating the VM 284B. Fingerprints (e.g., hashes) of the blocks in the duplicate volumes may be generated. For read or write operations 230 from the VM 224 directed to blocks in the volume(s) that have not been migrated, the migration initiator 206 may send requests for fingerprints of the blocks to the migration appliance 206 on the client network 270 via the connection 208. The migration appliance 204 returns the fingerprints of the blocks in the volumes 292B on the client network 270. The migration initiator 206 checks the fingerprints of the blocks in the duplicate volumes against the fingerprints of the blocks in volume(s) 292B that are returned by the migration appliance 204. For fingerprint matches, the migration initiator 206 retrieves the blocks from the duplicate volume(s), fulfills the read/write operations, and writes the blocks to the volumes 242 on the provider network 200. For fingerprint misses, the migration initiator 206 sends requests for the blocks to the migration appliance 204, which returns the blocks from the volumes 292B on the client network 270, converting the blocks if necessary. The migration initiator 206 fulfills the respective read/write operations 230, and writes the blocks to the volumes 242 on the provider network 200.

In some embodiments, the migration appliance 204 may encrypt the data 296B according to an encryption protocol specified by the client network 270 prior to sending the data 296B to the migration initiator 206 over the connection 208. In some embodiments, the migration appliance 204 may compress the data 296B according to a compression technique prior to sending the data 296B to the migration initiator 206 over the connection 208. The migration initiator 206 may decrypt and/or decompress the data 296B prior to storing the data 296B to the volumes 242 and providing requested data 296D to the VMM 224.

In some embodiments, a user interface to the migration service 202 displayed on the console 272, for example as illustrated in FIG. 12, may be updated to reflect the current status of the migration during the migration processes of FIG. 2E.

Figure 2F:
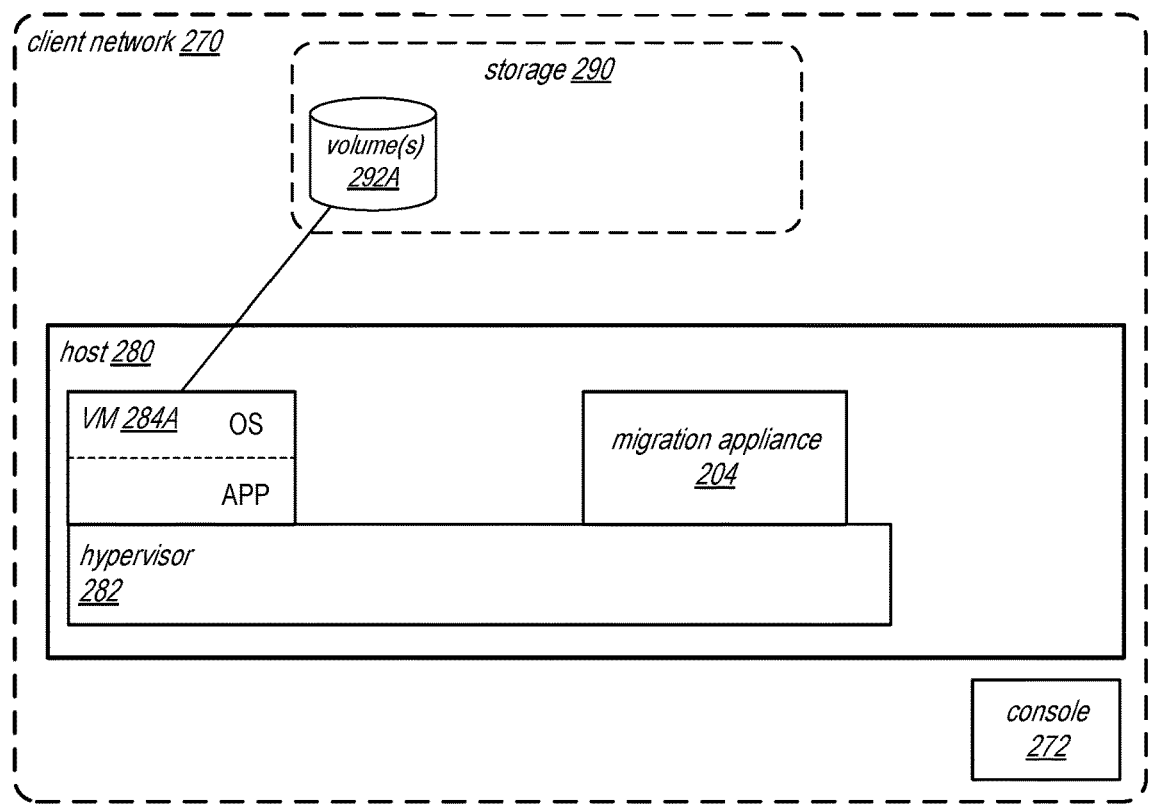
Figure 2F:
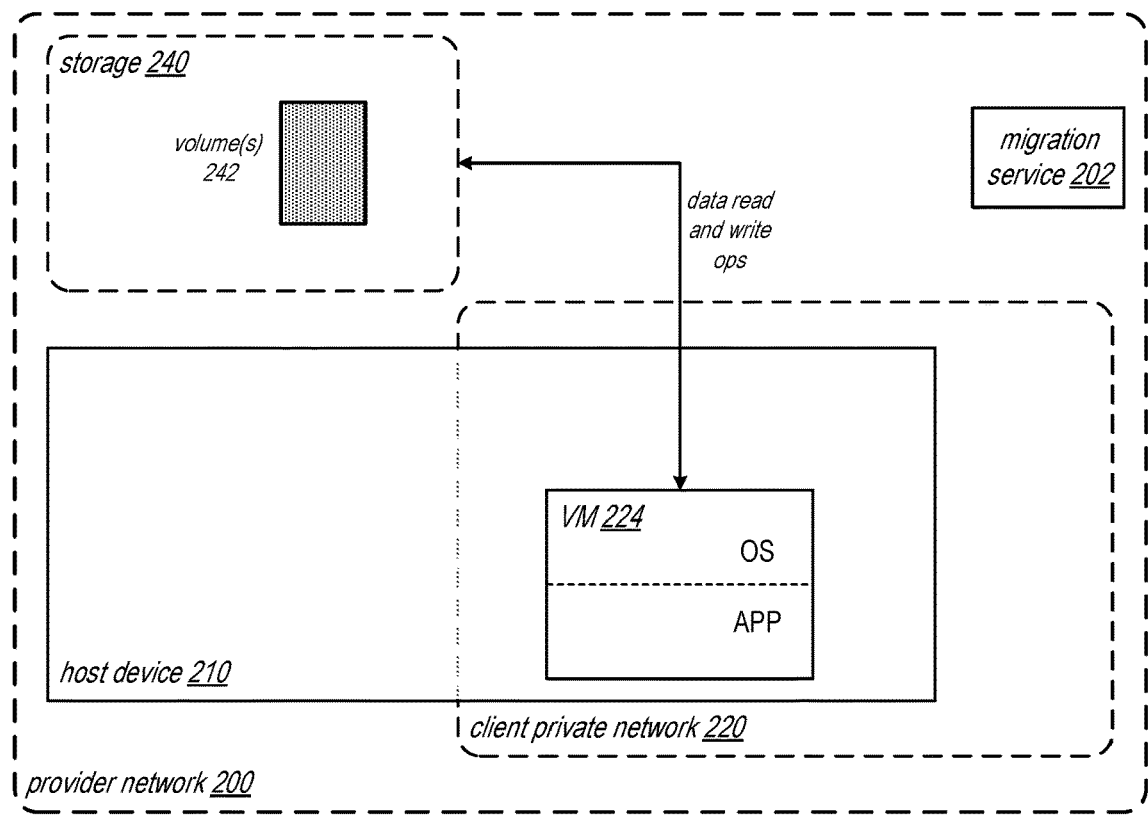
Figure 3:
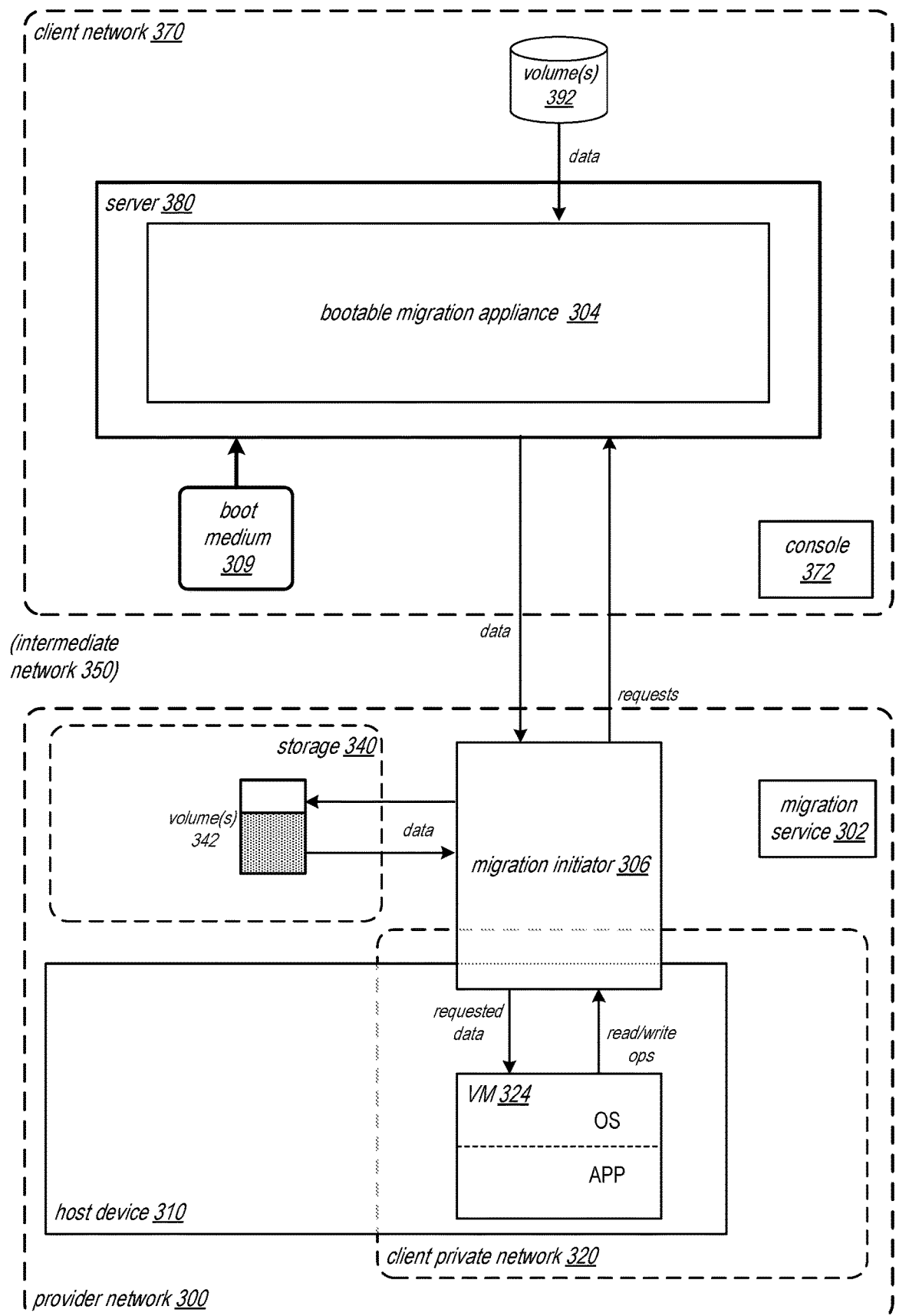
FIG. 3 is a block diagram that graphically illustrates methods and apparatus for migrating a server from a client network to a provider network, according to some embodiments.

FIG. 2F illustrates the provider network environment after completion of the migration to the provider network 200 and cleanup of the migration process, according to some embodiments. After all of the data from the volume(s) 292B on the client network 270 has been migrated and stored to volume(s) 242 on the provider network 200, a cleanup process may be performed. The network connection 208 between the migration appliance 204 and the migration initiator 206 may be dropped or closed, the migration initiator 206 may be shut down, and data read and write operations from the VM 224 to the VM's attached volumes may be directed to the storage 240 subsystem on which the volume(s) 242 are instantiated as in normal provider network operation. The VM 284B instance on host 280 on the client network 270 may be uninstalled. When migrating VMs 284 from a host 280 on the client network 270, the migration appliance 204 instance may remain installed to perform additional migrations if desired, or may be uninstalled. When migrating a physical server, for example as illustrated in FIG. 3, the physical server may be shut down and rebooted without the storage medium to uninstall the appliance functionality. In some embodiments, a user interface to the migration service 202 displayed on the console 272, for example as illustrated in FIG. 12, may be updated to reflect that the migration is complete.

FIG. 3 is a block diagram that graphically illustrates methods and apparatus for migrating a server from a client network to a provider network, according to some embodiments. In some embodiments, a server 380 to be migrated may be a physical device on the client network 270. In some embodiments, to prepare for migration of the server 380, a boot medium 309, for example a USB key, CD, or DVD, is inserted into the server (e.g., into a USB port or CD/DVD drive), and the server 380 is rebooted to load the migration appliance 304 on the physical device. The migration appliance 304 then has access to the volume(s) 392 that are attached to the server 380. The provider network 300 is prepared for the migration, for example as illustrated in FIG. 2C; a migration initiator 306, VM 324, and volume(s) 342 for the migration are instantiated, and a network connection is established between the migration appliance 304 on the server 380 and the migration initiator 206 on the provider network 200. The VM 324 may then be booted as illustrated in FIG. 2D, and the migration process may proceed after the boot as illustrated in FIG. 2E. During the cleanup process after the migration is complete, the boot medium 309 may be removed and the server 380 may be shut down and rebooted to uninstall the appliance 304.

FIG. 4A is a block diagram that graphically illustrates components and operations of a migration initiator in a provider network, according to some embodiments. In some embodiments, the migration initiator may include a migration driver 406A component and a migration engine 406B component, with the migration driver 406A instantiated on the host device 410 in the provider network 400 on which the VM 424 is instantiated and the migration engine 406B instantiated on one or more devices on the provider network 400 and external to the host device 410.

During migration of a server (e.g., a VM or a physical server) from the client network 470 to the VM 424 on the provider network 200, the migration driver 406A may receive (e.g., intercept) read and write operations from the VM 424 and send requests for data to the migration engine 406B. The migration engine 406B may maintain a block map 408 for the volume(s) being migrated that indicates blocks that have been migrated and blocks that have not been migrated. The migration engine 406B checks the block map 408 to see if the block(s) indicated by the requests have been fetched from the remote volume(s) 492 and stored to the local volume(s) 442. If the block(s) for a request are in a local volume 442 (i.e., have already been migrated), the migration engine 406B satisfies the request from the local volume 442. If the block(s) are not in a local volume 442, the migration engine 406B sends a request for at least the requested block(s) to the migration appliance 404 on the client network 470. The migration appliance 404 reads the blocks from volume 492, converts the blocks if necessary, and sends the blocks to the migration engine 406B over the connection. In some embodiments, the migration appliance 404 may encrypt and/or compress the blocks before sending the blocks. The migration engine 406B fulfills the request by providing at least some of the blocks to the migration driver 406A and stores the blocks to the local volume(s) 442, decrypting and/or decompressing the blocks if necessary.

Figure 4B:
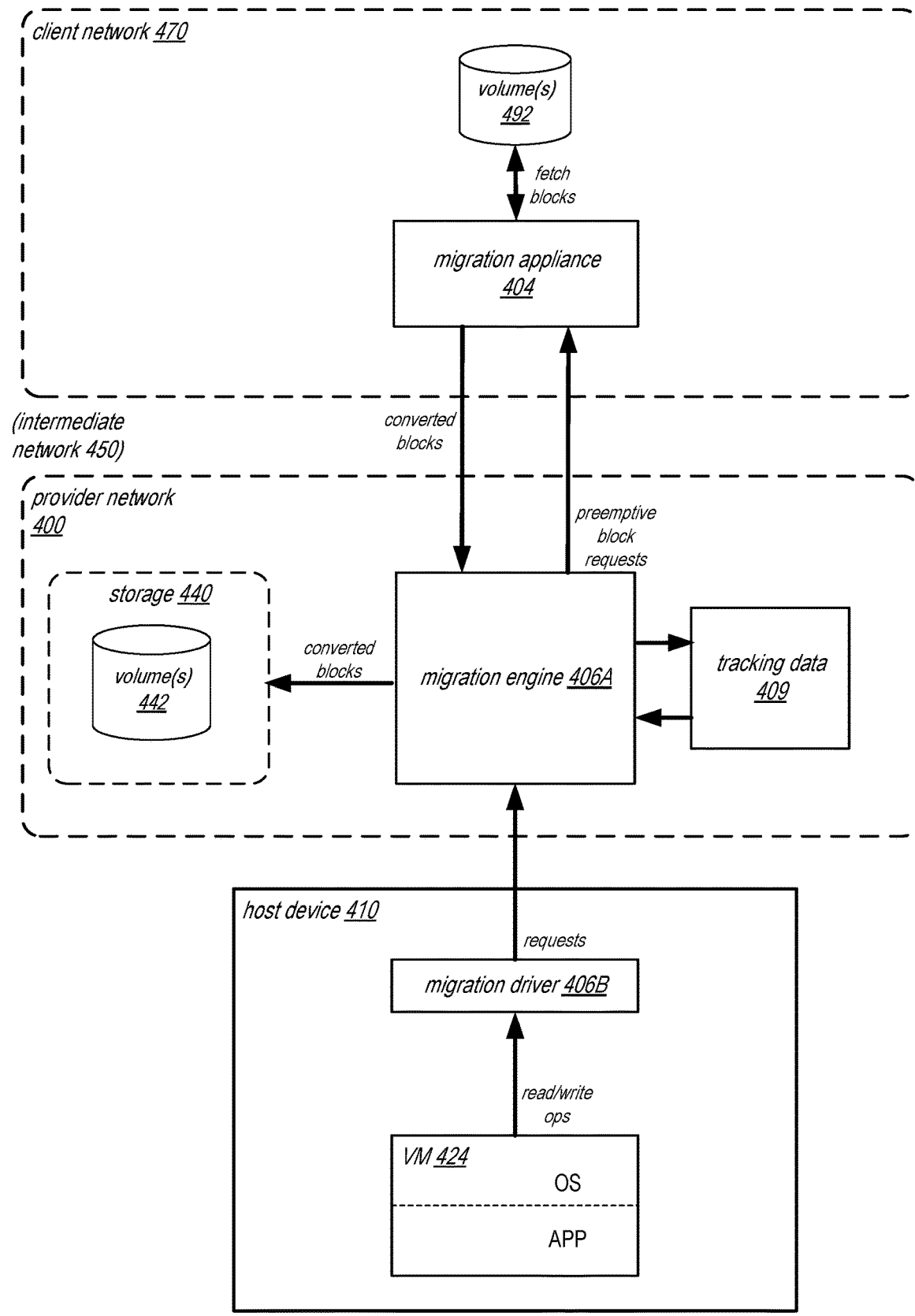
FIG. 4B is a block diagram that graphically illustrates preemptive block migration during a migration process in a provider network environment, according to some embodiments.
Figure 5:
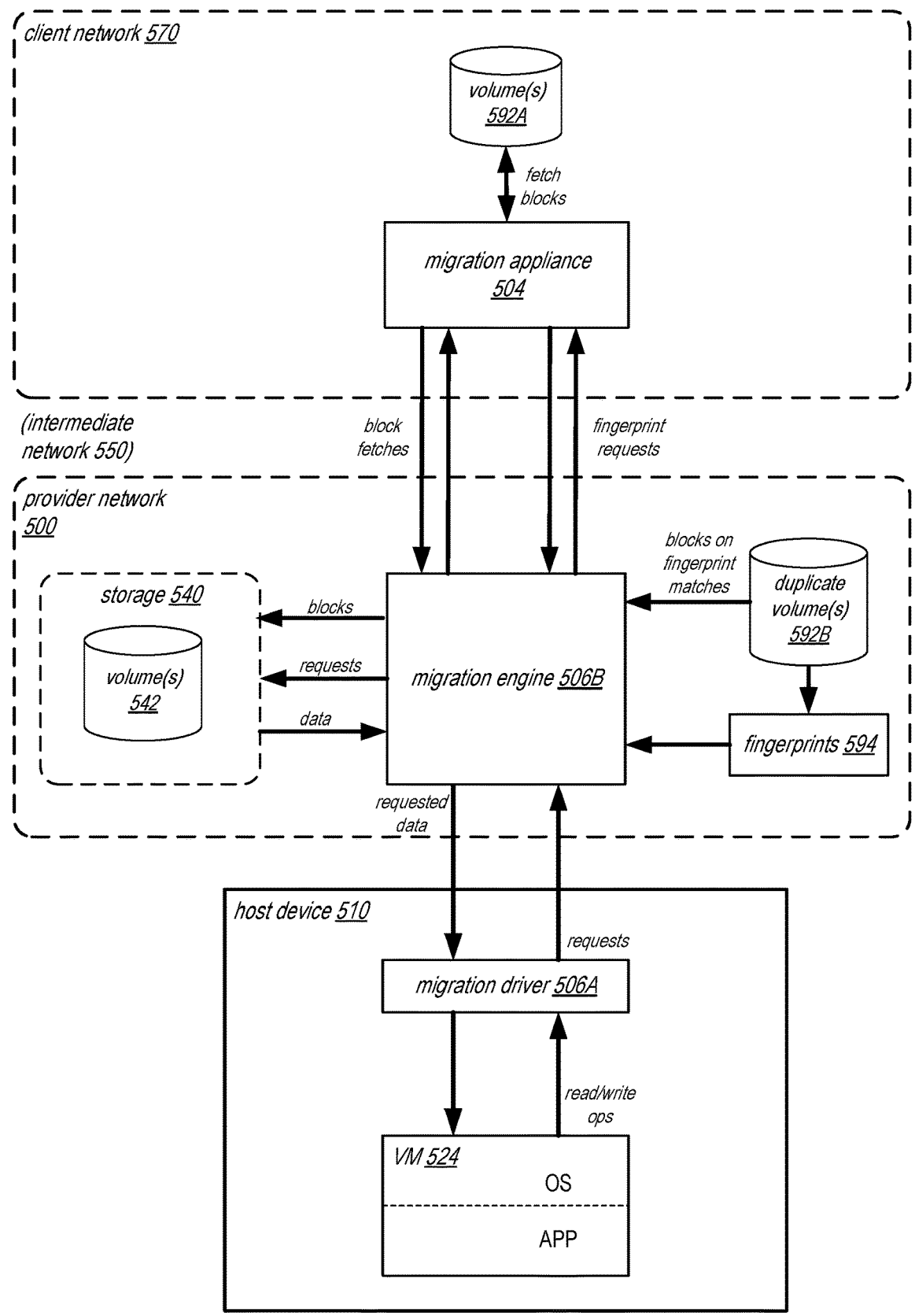
FIG. 5 is a block diagram that graphically illustrates obtaining blocks from a duplicate volume in the provider network, according to some embodiments.

FIG. 4B is a block diagram that graphically illustrates preemptive block migration during a migration process in a provider network environment, according to some embodiments. In some embodiments, the migration engine 406B may perform preemptive block migration continuously in the background during the migration process to preemptively migrate blocks from the volume(s) 492 on the client network 470 to the volume(s) 442 on the provider network 400 when bandwidth is available on the network connection between the migration appliance 404 and the migration engine 406B. In some embodiments, the migration engine 406B determines sets of blocks to be preemptively migrated from the volume(s) 492 on the client network 470 to the volume(s) 442 in storage 440 on the provider network 400. The migration engine 406B sends requests for the sets of blocks to the migration appliance 404 on the client network 470 over the connection. The migration appliance 404 reads the blocks from the volume(s) 492 on the client network 470, converts the blocks if necessary, and sends the converted blocks to the migration engine 406B. The migration engine 406B stores the blocks to the local volume(s) 442.

In various embodiments, the migration engine 406B may determine the sets of blocks to be preemptively migrated according to one or more methods. In some embodiments, the migration engine 406B may maintain a block map for the volume(s) that indicates blocks that have been migrated and blocks that have not been migrated, for example as illustrated in FIG. 4A. To determine sets of blocks for migration, the migration engine 406B may check the block map to locate sets of blocks that have not yet been migrated. In some embodiments, the migration engine 406B may track the read and/or write operations from the VM 424 on the host device 410 to blocks in the volume(s), and may maintain tracking data 409 for the operations. To determine sets of blocks for migration, the migration engine 406B may detect patterns in the tracking data 409 and, upon detecting a pattern, may determine the sets of blocks to be migrated according to the pattern. For example, a detected pattern may indicate two or more blocks that are accessed from the volume(s) in a sequence, and one or more sets of blocks may be selected for migration that include blocks that are ahead of the two or more blocks on the volume(s) in the sequence. As another example, a detected pattern may indicate a pattern used for accessing blocks from a boot volume during the boot process for the operating system (OS) of the VM 424, and one or more sets of blocks may be selected for migration that include blocks in the boot volume that are to be accessed according to the pattern during the boot process for the OS.

FIG. 5 is a block diagram that graphically illustrates obtaining blocks from a duplicate volume in the provider network, according to some embodiments. In some embodiments, one or more duplicate volumes 592B of the volume(s) 592A on the client network 570 may be uploaded to the provider network 500 prior to migrating the server from the client network 570 to the provider network 500. Fingerprints (e.g., hashes) of the blocks in the duplicate volume(s) 592B may be generated. For read or write operations from the VM 524 that are intercepted by the migration driver 506A and that are directed to blocks in the volume(s) that have not been migrated, the migration engine 506B may send requests for fingerprints of the blocks to the migration appliance 506 on the client network 570 via the connection. The migration appliance 504 returns the fingerprints of the blocks in the volumes 592A on the client network 570. The migration engine 506B checks the fingerprints of the blocks in the duplicate volumes 592B against the fingerprints of the blocks in volume(s) 592A that are returned by the migration appliance 504. For fingerprint matches, the migration engine 506B retrieves the blocks from the duplicate volume(s) 592B, fulfills the read/write operations, and writes the blocks to the volumes 542 on the provider network 500. For fingerprint misses, the migration engine 506B sends requests for the blocks to the migration appliance 504, which returns the blocks from the volumes 592A on the client network 570, converting the blocks if necessary. In some embodiments, the migration appliance 504 may encrypt and/or compress the blocks before sending the blocks. The migration engine 506B fulfills the respective read/write operations, and writes the blocks to the volumes 542 on the provider network 400.

Figure 6:
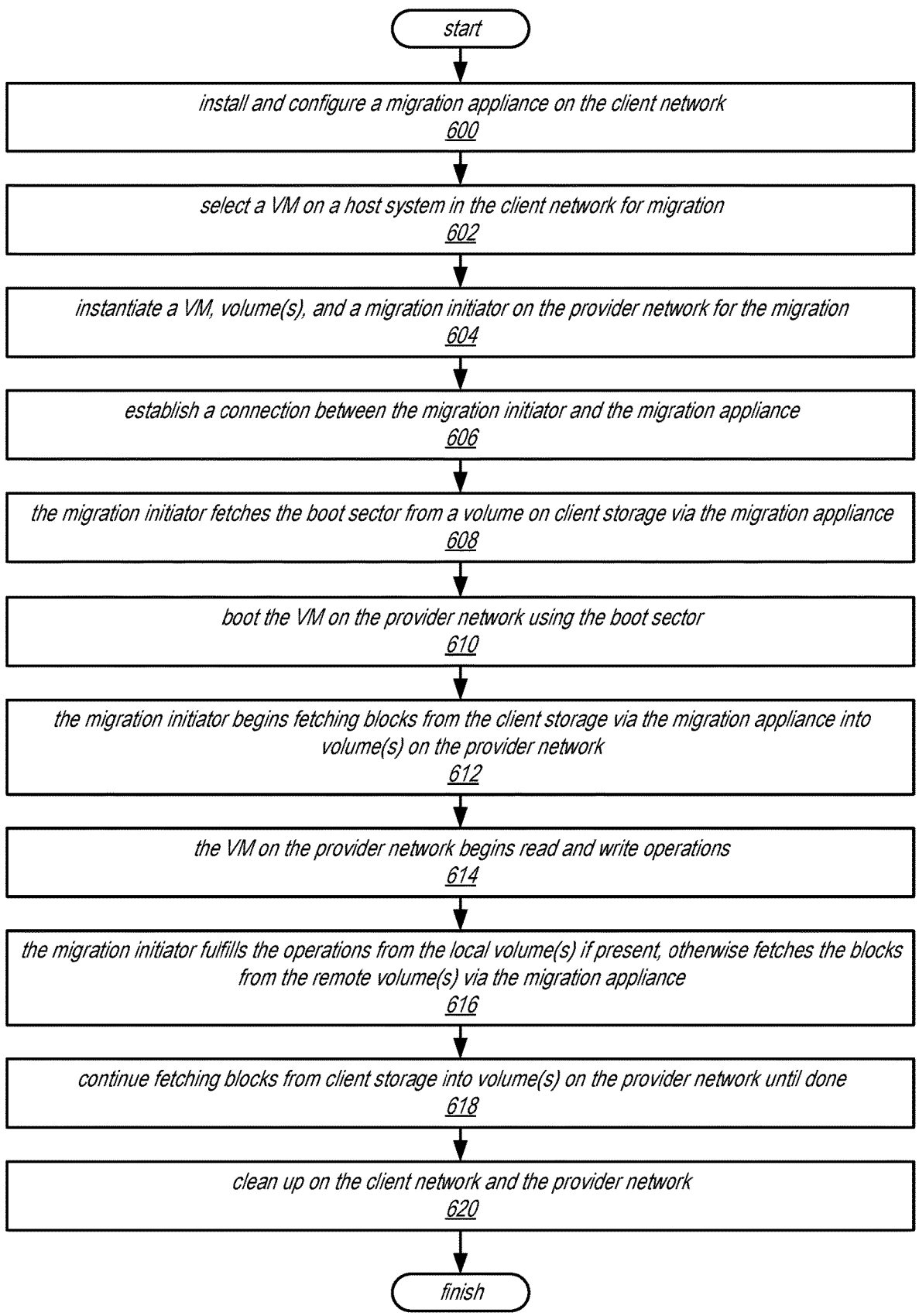
FIG. 6 is a flowchart of a method for migrating VMs from client networks to a provider network, according to some embodiments.

FIG. 6 is a flowchart of a method for migrating VMs from client networks to a provider network, according to some embodiments. As indicated at 600, a migration appliance may be installed and configured on the client network. As indicated at 602, the customer may select a VM on a host system in the client network for migration. An example user interface to a migration service that may be used to select the VM is illustrated in FIG. 12. As indicated at 604, a VM, volume(s), and a migration initiator may be instantiated on the provider network for the migration. As indicated at 606, a connection may be established between the migration initiator and the migration appliance over an intermediate network such as the Internet.

As indicated at 608, the migration initiator fetches the boot sector from a volume on client network storage via the migration appliance. In some embodiments, the migration appliance may convert the boot sector to a format used on the provider network prior to sending the boot sector to the migration initiator. As indicated at 610, the VM is booted on the provider network using the boot sector obtained from the client network.

As indicated at 612, the migration initiator begins fetching blocks from the volume(s) on the client storage via the migration appliance and storing the blocks into the volume(s) on the provider network. In some embodiments, the migration appliance may convert the blocks to a format used on the provider network prior to sending the blocks to the migration initiator. In some embodiments, the migration appliance may encrypt the blocks according to an encryption protocol provided by the client network prior to sending the blocks. In some embodiments, the migration appliance may compress the blocks according to a compression technique prior to sending the blocks.

As indicated at 614, the VM on the provider network begins generating read and write operations for blocks in the volume(s). As indicated at 616, the migration initiator intercepts the operations, and fulfills the read operations from the local volume(s) if present, and if not present in the local volume(s) fetches the blocks from the remote volume(s) via the migration appliance. Similarly, for write operations, the migration initiator fulfills the write operations to the local volume(s), fetching the targeted block(s) from the remote volume(s) if not present prior to the writes.

As indicated at 618, the migration initiator continues fetching blocks from the volume(s) in the client network and storing the blocks into the volume(s) on the provider network until done. As indicated at 620, a cleanup may be performed on the client network and the provider network after all of the data for the VM has been fetched from the volume(s) in the client network and storing the blocks into the volume(s) on the provider network.

Figure 7:
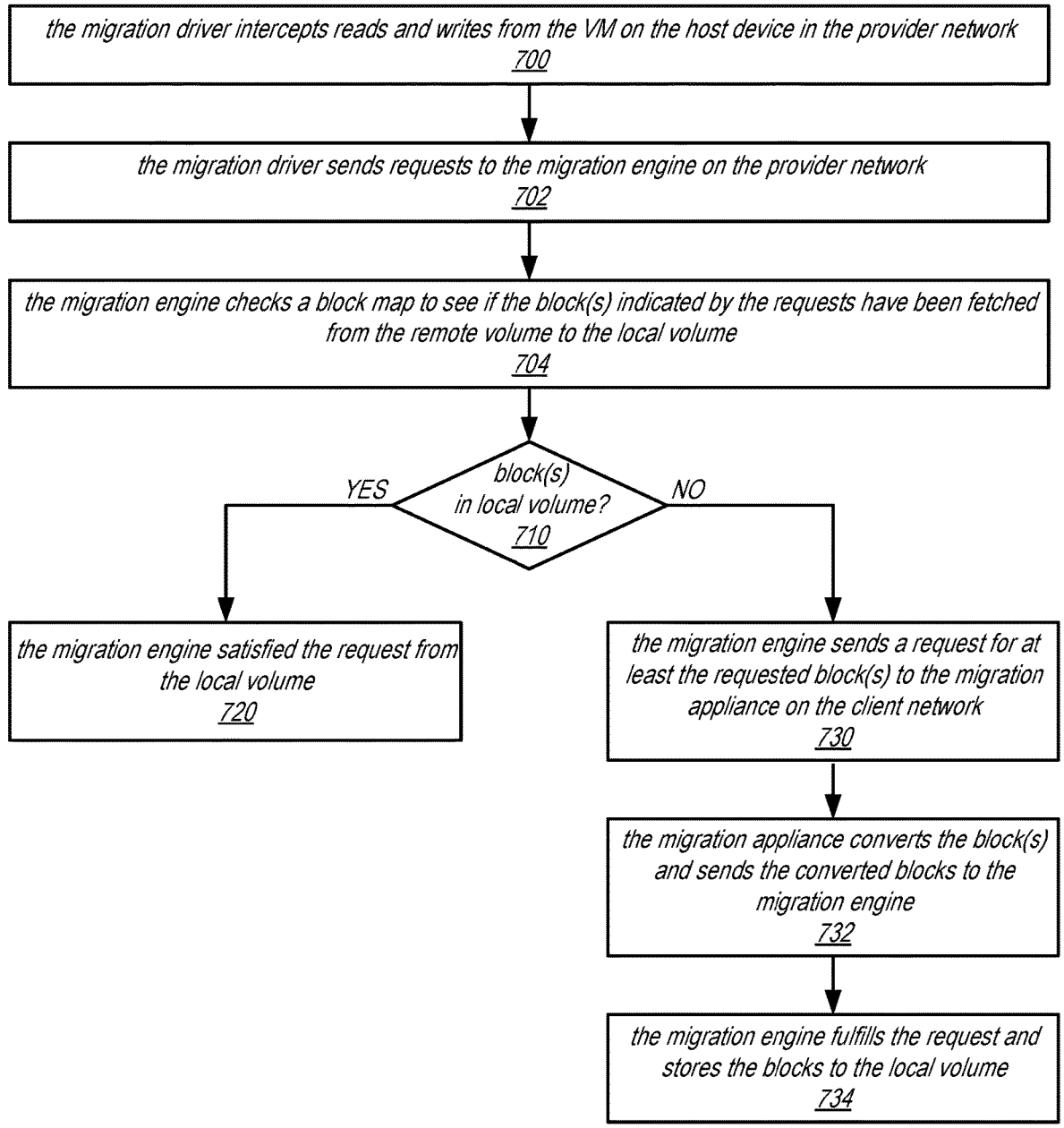
FIG. 7 is a flowchart of a method for processing read and write operations from the VM on the provider network during the migration process, according to some embodiments.

FIG. 7 is a flowchart of a method for processing read and write operations from the VM on the provider network during the migration process, according to some embodiments. As indicated at 700, the migration driver intercepts read and write operation from the VM on the host device in the provider network. As indicated at 702, the migration driver sends requests indicating the operations to the migration engine on the provider network. As indicated at 704, the migration engine checks a block map to see if the block(s) indicated by the requests have been fetched from the remote volume and stored to the local volume. At 710, if the block(s) for a request are in a local volume (i.e., have already been migrated), the migration engine satisfies the request from the local volume as indicated at 720. At 710, if the block(s) are not in a local volume, the migration engine sends a request for at least the requested block(s) to the migration appliance on the client network, as indicated at 730. As indicated at 732, the migration appliance converts the requested block(s) and sends the converted blocks to the migration engine. In some embodiments, the migration appliance may encrypt and/or compress the blocks before sending the blocks. As indicated at 734, the migration engine then fulfills the request by providing at least some of the blocks to the migration driver and stores the blocks to the local volume(s), decrypting and/or decompressing the blocks if necessary.

Figure 8:
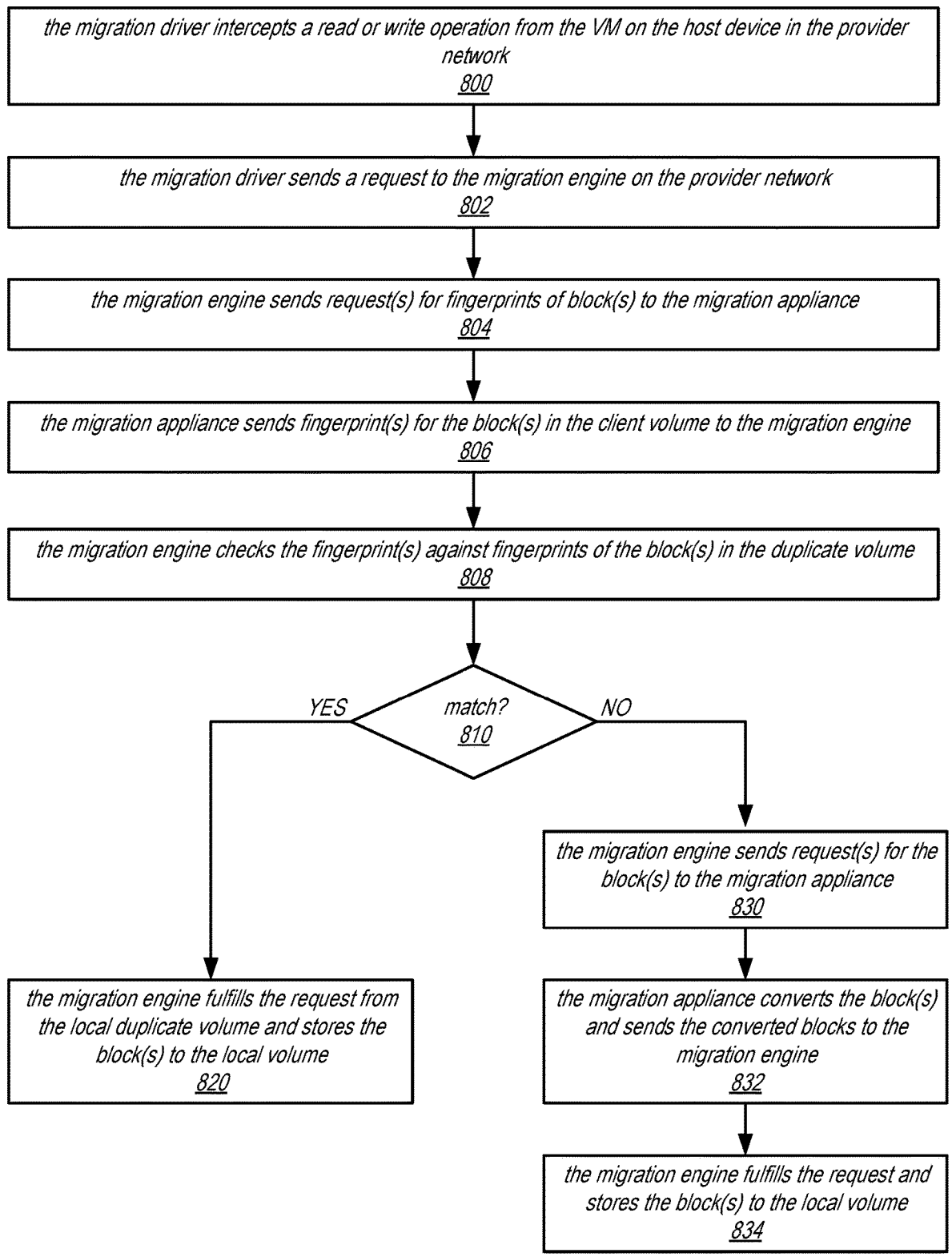
FIG. 8 is a flowchart of a method for fulfilling requests using blocks from a duplicate volume on the provider network, according to some embodiments.

FIG. 8 is a flowchart of a method for fulfilling requests using blocks from a duplicate volume on the provider network, according to some embodiments. In some embodiments, duplicates of the volume(s) in the client network may be uploaded to and stored in the provider network at some time prior to starting the migration. The duplicate volume(s) may be accessed during the migration process to obtain block(s) to be migrated from a local source (the duplicate volume(s)) rather than from a remote source (the volume(s) on the client network). However, the duplicate volume(s) are not the authoritative source for blocks during migration, as the volume(s) may have been modified on the client network after the duplicate volume(s) were generated and prior to the migration process, and thus the migration engine must check block(s) in the duplicate volume to ensure that the blocks are up-to-date prior to using the block(s) during the migration process.

As indicated at 800 of FIG. 8, the migration driver intercepts a read or write operation from the VM on the host device in the provider network. As indicated at 802, the migration driver sends a request indicating the read or write operation to the migration engine on the provider network. As indicated at 804, the migration engine sends requests for fingerprint(s) for the block(s) in the client volume to the migration appliance. As indicated at 806, the migration appliance sends fingerprint(s) for the block(s) in the client volume to the migration engine.

As indicated at 808, the migration engine checks the fingerprint(s) received from the migration appliance against fingerprint(s) of the blocks in the duplicate volume. At 810, for fingerprint(s) that match, the migration engine fulfills the request using respective blocks from the local duplicate volume and stores the block(s) from the duplicate volume to the local volume as indicated at 820. At 810, for fingerprint(s) that do not match, the migration engine sends requests for the respective blocks to the migration appliance as indicated at 830. The migration appliance converts the respective block(s) and sends the converted blocks to the migration engine, as indicated at 832. The migration engine fulfills the request using the converted blocks received from the migration appliance and stores the block(s) to the local volume, as indicated at 834.

Figure 9:
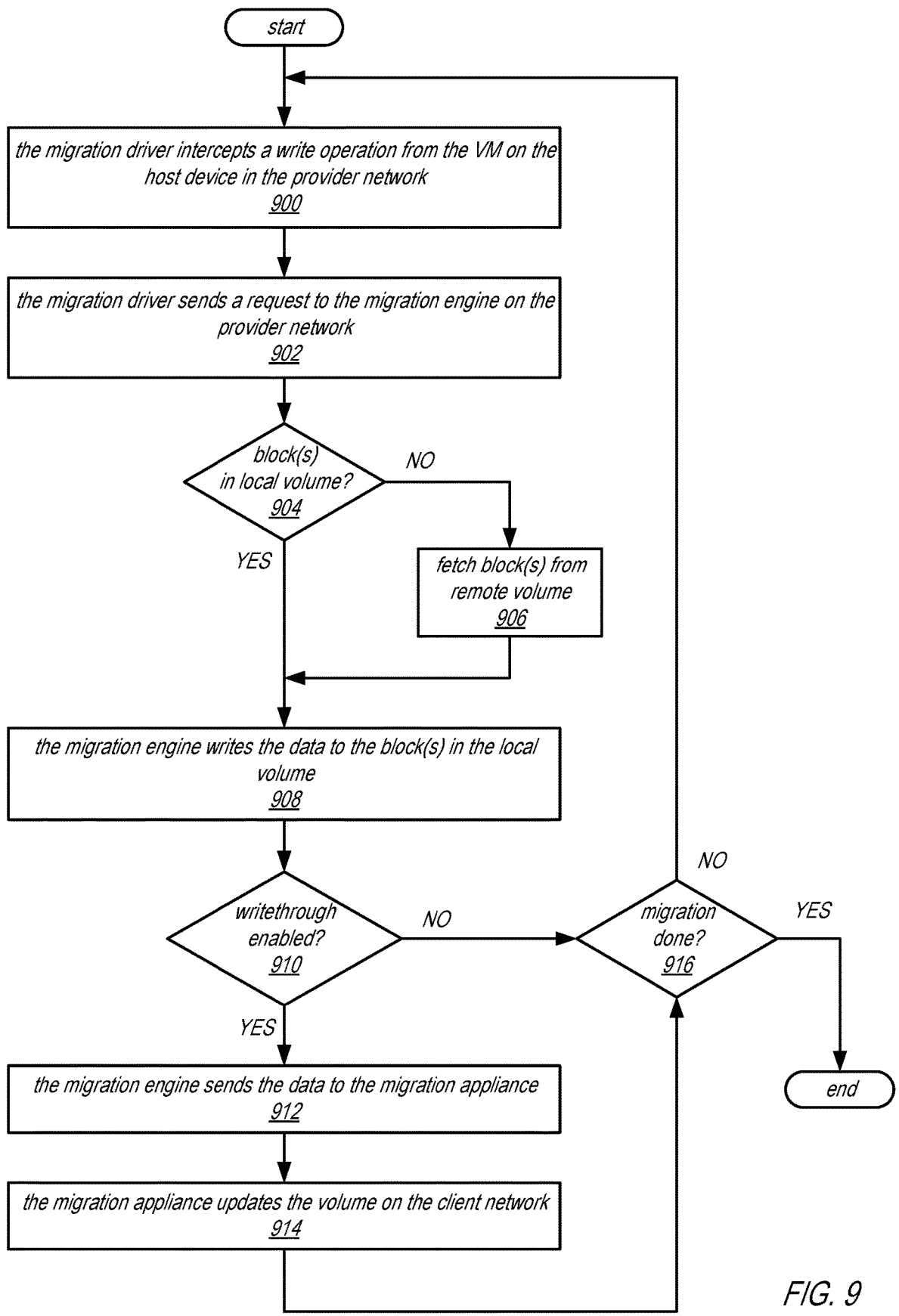
FIG. 9 is a flowchart of a method for processing write operations from the VM on the provider network during the migration process, according to some embodiments.

FIG. 9 is a flowchart of a method for processing write operations from the VM on the provider network during the migration process, according to some embodiments. As indicated at 900, the migration driver intercepts a write operation the VM on the host device in the provider network, the write operation indicating data to be written to one or more blocks in the volume(s). As indicated at 902, the migration driver sends a request indicating the write operation to the migration engine on the provider network. At 904, if block(s) to be modified by the write operation have not been migrated to the local volume(s), for example as indicated by a block map maintained by the migration engine, then the block(s) may be fetched from the remote volume(s) via the migration appliance as indicated at 906. As indicated at 908, the migration engine writes the data to the block(s) in the local volume.

In some embodiments, a client may enable a writethrough mode for migrations. In writethrough mode, writes to blocks in the volume are made to the local volumes and mirrored to the remote volumes via the migration appliance. Thus, the remote volume(s) are kept up to data, and can be used to switch back to the server on the client network if necessary or desired without loss of data or significant downtime. At 910, if writethrough is not enabled for this migration, the method goes to element 916. At 916, if migration is not done (i.e., if there are more blocks to be migrated), the method returns to element 900; otherwise, the migration is done. At 910, if writethrough is enabled for this migration, then as indicated at 912, the migration engine sends the data to the migration appliance. As indicated at 914, the migration appliance updates the volume on the client network, and then the method goes to 916. At 916, if migration is not done (i.e., if there are more blocks to be migrated), the method returns to element 900; otherwise, the migration is done.

Figure 10:
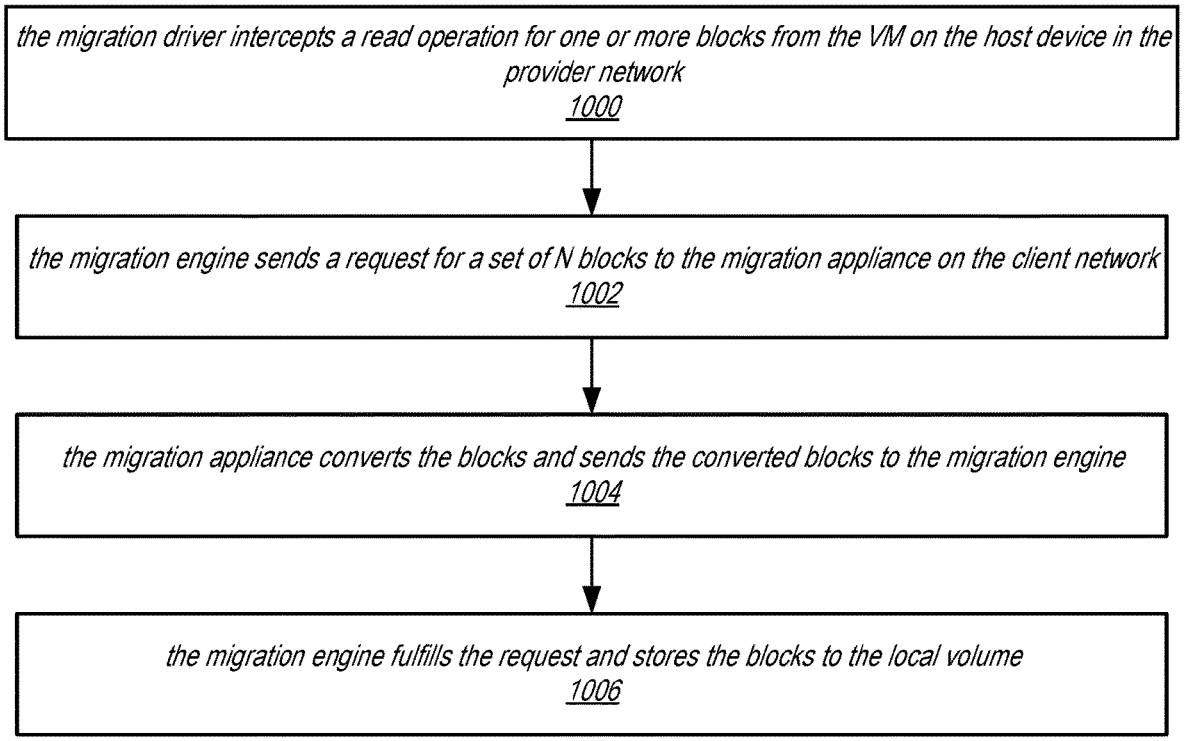
FIG. 10 is a flowchart of a method for fulfilling read operations from the VM on the provider network from the volume(s) on the client network during the migration process.

FIG. 10 is a flowchart of a method for fulfilling read operations from the VM on the provider network from the volume(s) on the client network during the migration process, according to some embodiments. As indicated at 1000, the migration driver intercepts a read operation for one or more blocks from the VM on the host device in the provider network. The migration driver may send a request to the migration engine indicating the read operation. As indicated at 1002, the migration engine sends a request for a set of blocks, including but not limited to the requested one or more blocks, to the migration appliance on the client network. In some embodiments, the request specifies some number N of blocks. In some embodiments, to utilize available throughput on the network connection efficiently, the migration engine determines N according to characteristics of the network connection including bandwidth of the connection and latency on the connection. For example, the migration engine may monitor latency on the network connection for fulfilling read requests sent to the migration appliance, and may determine a number of bytes that can be transferred over the network connection in that amount of time according to the bandwidth of the connection. The migration engine may then determine N (the number of blocks to be fetched in a request) as a function of the latency and the bandwidth to utilize the available throughput on the network connection when requesting blocks for read or write operations. Note that, for blocks that have already been migrated, the migration engine may fulfill the request from the volume(s) on the provider network.

As indicated at 1004, the migration appliance reads the blocks from the volume(s) on the client network, converts the blocks, and sends the converted blocks to the migration engine. As indicated at 1006, the migration engine fulfills the request, for example by providing the one or more blocks specified by the read operation to the VM, and stores the set of blocks including but not limited to the one or more blocks to the local volume.

Figure 11:
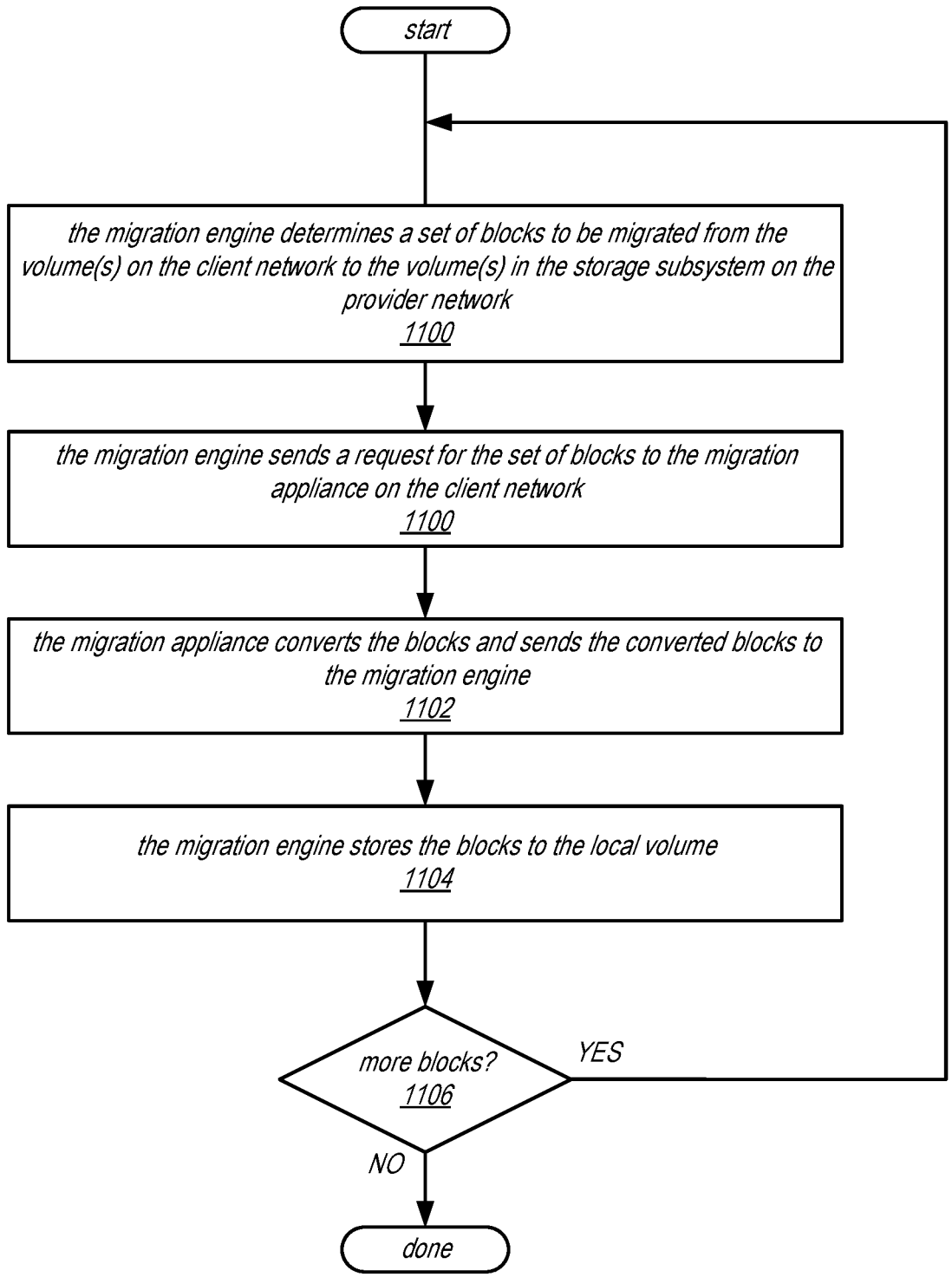
FIG. 11 is a flowchart of a method for preemptively fetching blocks from the remote volume during the migration process, according to some embodiments.

FIG. 11 is a flowchart of a method for preemptively fetching blocks from the remote volume during the migration process, according to some embodiments. In some embodiments, the method of FIG. 11 may run as a process continuously in the background during the migration process to preemptively migrate blocks from the volume(s) on the client network to the volume(s) on the provider network when bandwidth is available on the network connection between the migration appliance and the migration engine. Also note that requests to fetch blocks for read and write operations may be given priority over the preemptive migration requests as illustrated in FIG. 11.

As indicated at 1100, the migration engine determines a set of blocks to be migrated from the volume(s) on the client network to the volume(s) in the storage subsystem on the provider network. In various embodiments, the migration engine may determine the set of blocks according to one or more methods. The following describes example methods for determining sets of blocks that may be used at element 1100 in embodiments.

In some embodiments, the migration engine may maintain a block map for the volume(s) that indicates blocks that have been migrated and blocks that have not been migrated, for example as illustrated in FIG. 4A. To determine sets of blocks for migration, the migration engine may check the block map to locate sets of blocks that have not yet been migrated.

In some embodiments, the migration engine may track read and/or write operations from the VM on the host device to blocks in the volume(s). To determine sets of blocks for migration, the migration engine may detect patterns in the tracked read and/or write operations and, upon detecting a pattern, may determine the sets of blocks to be migrated according to the pattern. For example, a detected pattern may indicate two or more blocks that are accessed from the volume(s) in a sequence, and one or more sets of blocks may be selected for migration that include blocks that are ahead of the two or more blocks on the volume(s) in the sequence. As another example, a detected pattern may indicate a pattern used for accessing blocks from a boot volume during a boot process for an operating system (OS) of the VM, and one or more sets of blocks may be selected for migration that include blocks in the boot volume that are to be accessed according to the pattern during the boot process for the OS.

As indicated at 1102, the migration engine sends a request for the set of blocks to the migration appliance on the client network. As indicated at 1104, the migration appliance reads the blocks from the volume(s) on the client network, converts the blocks if necessary, and sends the converted blocks to the migration engine. As indicated at 1106, the migration engine stores the blocks to the local volume(s). At 1108, if there are more blocks to be fetched from the client network (i.e., if the migration is not complete), then the method returns to 1100. Otherwise, all blocks have been migrated from the volume(s) on the client network to the volume(s) on the provider network, and the migration is done. For example, in some embodiments, at 1108, the migration engine may access a block map indicating which blocks have been migrated to determine if there are more blocks to be migrated as illustrated in FIG. 4A.

FIG. 12 shows an example user interface to the migration service, according to some embodiments. As shown in FIG. 12, a provider network 1200 may include a migration service 1202 and an application programming interface (API) 1204 to the migration service 1202. A client network may include a console 1272, for example implemented on a device as illustrated in FIG. 17. The migration service 1202 may provide a user interface (UI) 1210 via the console 1272 that exposes functionality of the migration service 1202 to the client via one or more user interface elements.

In some embodiments, the migration UI 1210 may include a server list 1250 that graphically or textually shows one or more servers 1284 on the client network 1270 that may be candidates for migration, or that are currently in the process of being migrated. Information about the server(s) 1284 may, for example, be collected by migration appliance(s) installed on the client network 1270 and provided by the migration appliance(s) to the migration service 1202, which may then display at least some of the information in server list 1250. For example, the servers 1284 may include VM instances in a virtualization environment on a host machine in the client network 1270 in which a migration appliance is installed, for example as a VM in the virtualization environment. As another example, the servers 1284 may include physical servers in the client network 1270 that have been booted or that are available to be booted from a storage medium (e.g., a USB key, CD, or DVD), for example provided by the service provider associated with the provider network 1200, that includes the migration appliance functionality that is installed on a server device upon booting the server device from the medium. In some embodiments, the user may select a server 1284 from the list 1250 to perform one or more migration functions for the selected server 1284. In this example, the user has selected server 1284B. In some embodiments, migration status information 1286 may be displayed for each server 1284. The migration status information 1286 for a server 1284 may, for example, indicate that a migration appliance has or has not been installed, that the migration preparation process has or has not been performed, that writethrough is or is not enabled for the migration, that migration has or has not been initiated, and if initiated, at what point in the migration process the server 1284 is at and an estimated completion time. Note that two or more servers 1284 may be in the process of migration at the same time.

The migration UI 1210 may provide one or more user interface elements, for example buttons and menus, for configuring and performing migrations. In some embodiments, the UI 1210 may include an install migration appliance 1212 UI element that allows the user to install a migration appliance on a selected server or servers, for example as illustrated in FIG. 2A. In some embodiments, installing a migration appliance may involve uploading the appliance software or bootable machine image from the provider network 1200 or from some other source to the selected server 1284 on the client network 1270.

In some embodiments, the UI 1210 may include a prepare for migration 1214 UI element for starting a migration preparation process for the selected server 1284, for example as illustrated in FIG. 2C. For example, in the preparation process, a migration initiator, shell VM, and one or more volumes for the migration may be instantiated on the provider network, the migration appliance may be notified to prepare for migration of the selected server 1284, and a connection may be established between the migration appliance and migration initiator over an intermediate network. In some embodiments, as part of the preparation process, the selected server 1284 (e.g., VM) may be shut down on the client network 1270, either by the user or remotely by the migration service 1202. For servers 1284 that are physical devices, the preparation process may involve rebooting the server 1284 with the storage medium (e.g., USB key, CD, or DVD) that includes the migration appliance functionality inserted in the server 1284, for example as illustrated in FIG. 3.

In some embodiments, the UI 1210 may include an enable writethrough 1216 UI element that allows the user to enable writethrough or mirroring of write operations to the volume(s) on the client network 1270 during the migration process, for example as illustrated in FIG. 9.

In some embodiments, the UI 1210 may include an initiate migration 1218 UI element for initiating the migration of the selected server 1284, for example as illustrated in FIG. 2D. In some embodiments, initiating the migration process may involve the migration service 1202 directing the host device on which the shell VM is instantiated in the provider network 1200 to boot the VM instance.

Example Provider Network Environments

This section describes example provider network environments in which embodiments of the methods and apparatus for migrating virtual machine instances in provider network environments as described in reference to FIGS. 1 through 12 may be implemented. However, these example provider network environments are not intended to be limiting.

Figure 13:
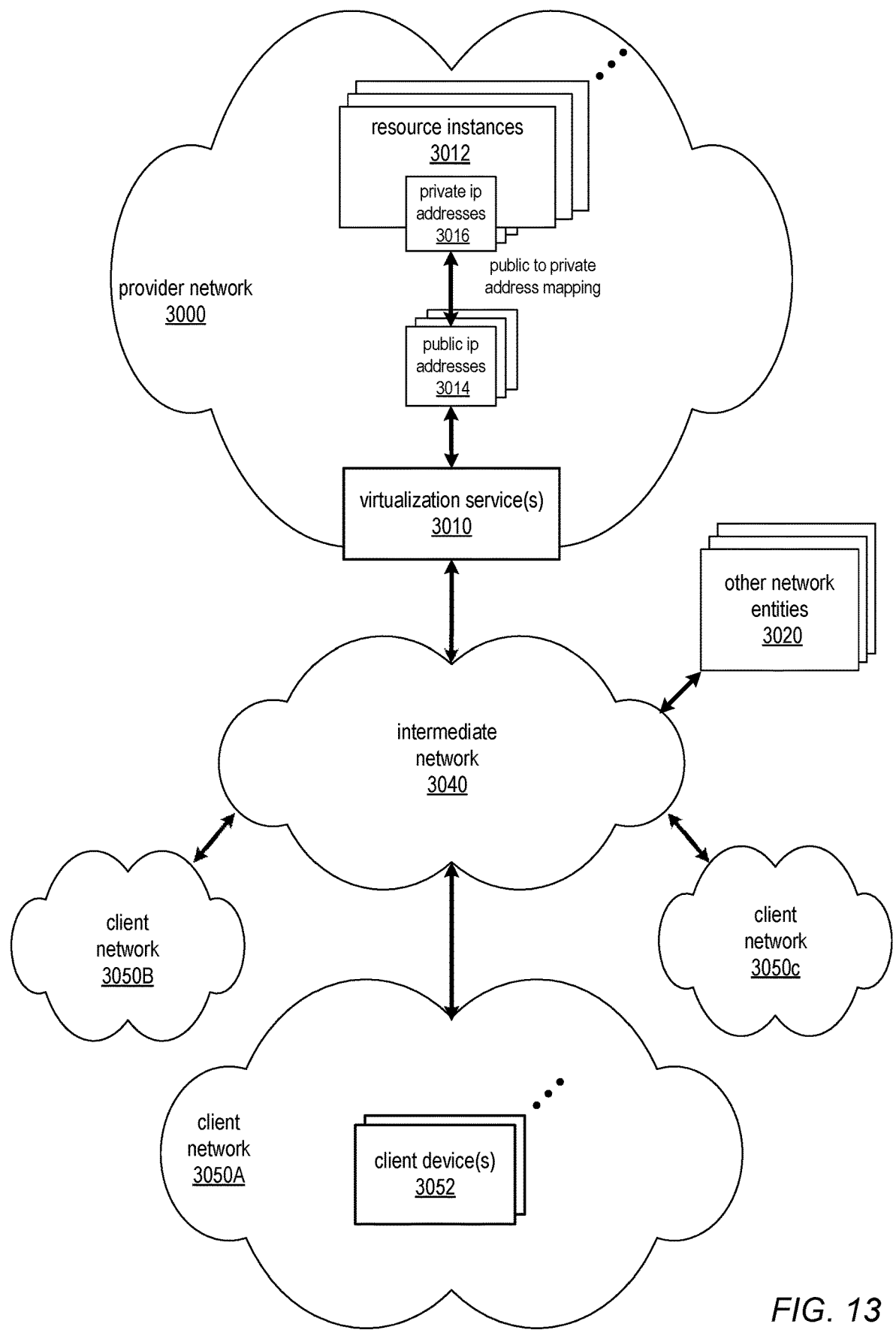
FIG. 13 illustrates an example provider network environment, according to some embodiments.

FIG. 13 illustrates an example provider network environment, according to some embodiments. A provider network 3000 may provide resource virtualization to clients via one or more virtualization services 3010 that allow clients to purchase, rent, or otherwise obtain instances 3012 of virtualized resources, including but not limited to computation and storage resources, implemented on devices within the provider network or networks in one or more data centers. Private IP addresses 3016 may be associated with the resource instances 3012; the private IP addresses are the internal network addresses of the resource instances 3012 on the provider network 3000. In some embodiments, the provider network 3000 may also provide public IP addresses 3014 and/or public IP address ranges (e.g., Internet Protocol version 4 (IPv4) or Internet Protocol version 6 (IPv6) addresses) that clients may obtain from the provider 3000.

Conventionally, the provider network 3000, via the virtualization services 3010, may allow a client of the service provider (e.g., a client that operates client network 3050A) to dynamically associate at least some public IP addresses 3014 assigned or allocated to the client with particular resource instances 3012 assigned to the client. The provider network 3000 may also allow the client to remap a public IP address 3014, previously mapped to one virtualized computing resource instance 3012 allocated to the client, to another virtualized computing resource instance 3012 that is also allocated to the client. Using the virtualized computing resource instances 3012 and public IP addresses 3014 provided by the service provider, a client of the service provider such as the operator of client network 3050A may, for example, implement client-specific applications and present the client's applications on an intermediate network 3040, such as the Internet. Other network entities 3020 on the intermediate network 3040 may then generate traffic to a destination public IP address 3014 published by the client network 3050A; the traffic is routed to the service provider data center, and at the data center is routed, via a network substrate, to the private IP address 3016 of the virtualized computing resource instance 3012 currently mapped to the destination public IP address 3014. Similarly, response traffic from the virtualized computing resource instance 3012 may be routed via the network substrate back onto the intermediate network 3040 to the source entity 3020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 3000; a client may then assign their allocated public IP addresses to particular resource instances allocated to the client. These public IP addresses may be referred to as client public IP addresses, or simply client IP addresses. Instead of being assigned by the provider network 3000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 14:
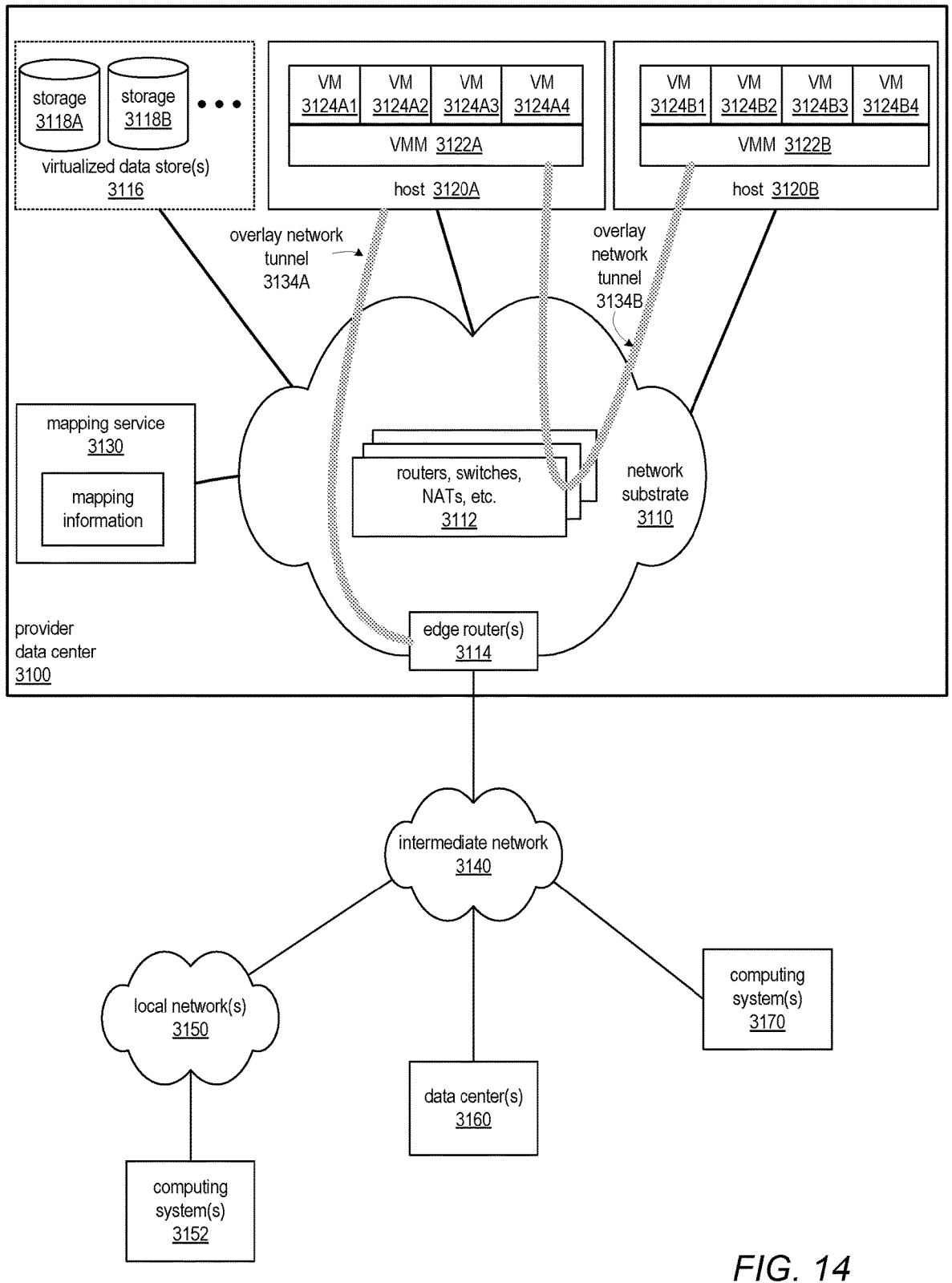
FIG. 14 illustrates an example data center that implements an overlay network on a network substrate using IP tunneling technology, according to some embodiments.

FIG. 14 illustrates an example data center that implements an overlay network on a network substrate using IP tunneling technology, according to some embodiments. A provider data center 3100 may include a network substrate that includes networking devices 3112 such as routers, switches, network address translators (NATs), and so on. Some embodiments may employ an Internet Protocol (IP) tunneling technology to provide an overlay network via which encapsulated packets may be passed through network substrate 3110 using tunnels. The IP tunneling technology may provide a mapping and encapsulating system for creating an overlay network on a network (e.g., a local network in data center 3100 of FIG. 14) and may provide a separate namespace for the overlay layer (the public IP addresses) and the network substrate 3110 layer (the private IP addresses). Packets in the overlay layer may be checked against a mapping directory (e.g., provided by mapping service 3130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 3130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 14, an example overlay network tunnel 3134A from a virtual machine (VM) 3124A on host 3120A to a device on the intermediate network 3150 and an example overlay network tunnel 3134B between a VM 3124B on host 3120B and a VM 3124C on host 3120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 14, at least some networks in which embodiments may be implemented may include hardware virtualization technology that enables multiple operating systems to run concurrently on a host computer (e.g., hosts 3120A and 3120B of FIG. 14), i.e. as virtual machines (VMs) 3124 on the hosts 3120. The VMs 3124 may, for example, be rented or leased to clients of a network provider. A hypervisor, or virtual machine monitor (VMM) 3122, on a host 3120 presents the VMs 3124 on the host with a virtual platform and monitors the execution of the VMs 3124. Each VM 3124 may be provided with one or more private IP addresses; the VMM 3122 on a host 3120 may be aware of the private IP addresses of the VMs 3124 on the host. A mapping service 3130 may be aware of all network IP prefixes and the IP addresses of routers or other devices serving IP addresses on the local network. This includes the IP addresses of the VMMs 3122 serving multiple VMs 3124.

The mapping service 3130 may be centralized, for example on a server system, or alternatively may be distributed among two or more server systems or other devices on the network. A network may, for example, use the mapping service technology and IP tunneling technology to, for example, route data packets between VMs 3124 on different hosts 3120 within the data center 3100 network; note that an interior gateway protocol (IGP) may be used to exchange routing information within such a local network.

In addition, a network such as the provider data center 3100 network (which is sometimes referred to as an autonomous system (AS)) may use the mapping service technology, IP tunneling technology, and routing service technology to route packets from the VMs 3124 to Internet destinations, and from Internet sources to the VMs 3124. Note that an external gateway protocol (EGP) or border gateway protocol (BGP) is typically used for Internet routing between sources and destinations on the Internet. FIG. 14 shows an example provider data center 3100 implementing a network that provides resource virtualization technology and that provides full Internet access via edge router(s) 3114 that connect to Internet transit providers, according to some embodiments. The provider data center 3100 may, for example, provide clients the ability to implement virtual computing systems (VMs 3124) via a hardware virtualization service and the ability to implement virtualized data stores 3116 on storage resources 3118 via a storage virtualization service.

The data center 3100 network may implement IP tunneling technology, mapping service technology, and a routing service technology to route traffic to and from virtualized resources, for example to route packets from the VMs 3124 on hosts 3120 in data center 3100 to Internet destinations, and from Internet sources to the VMs 3124. Internet sources and destinations may, for example, include computing systems 3170 connected to the intermediate network 3140 and computing systems 3152 connected to local networks 3150 that connect to the intermediate network 3140 (e.g., via edge router(s) 3114 that connect the network 3150 to Internet transit providers). The provider data center 3100 network may also route packets between resources in data center 3100, for example from a VM 3124 on a host 3120 in data center 3100 to other VMs 3124 on the same host or on other hosts 3120 in data center 3100.

A service provider that provides data center 3100 may also provide additional data center(s) 3160 that include hardware virtualization technology similar to data center 3100 and that may also be connected to intermediate network 3140. Packets may be forwarded from data center 3100 to other data centers 3160, for example from a VM 3124 on a host 3120 in data center 3100 to another VM on another host in another, similar data center 3160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 3118, as virtualized resources to clients of a network provider in a similar manner.

Figure 15:
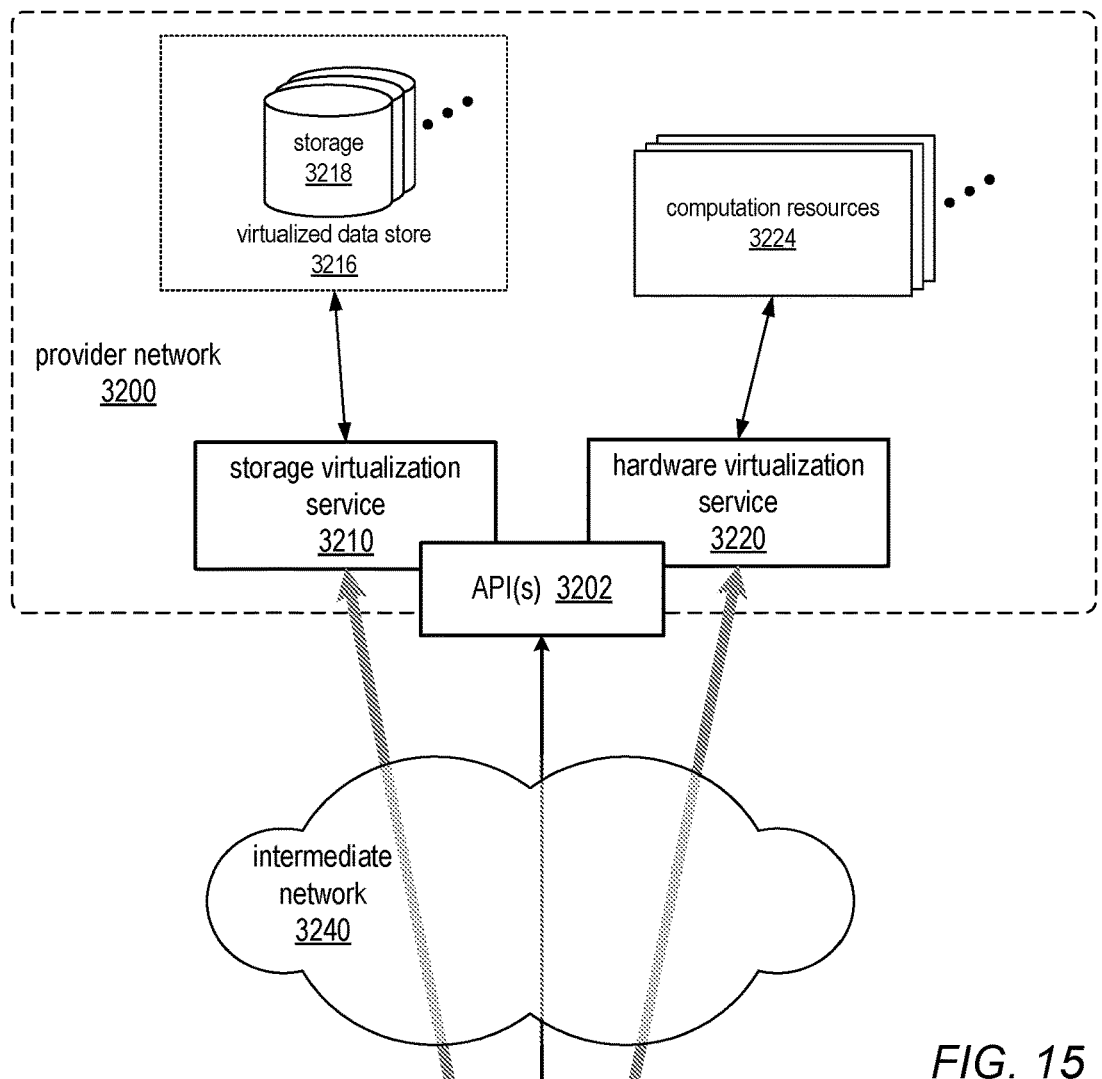
FIG. 15 is a block diagram of an example provider network that provides a storage virtualization service and a hardware virtualization service to clients, according to some embodiments.
Figure 15:
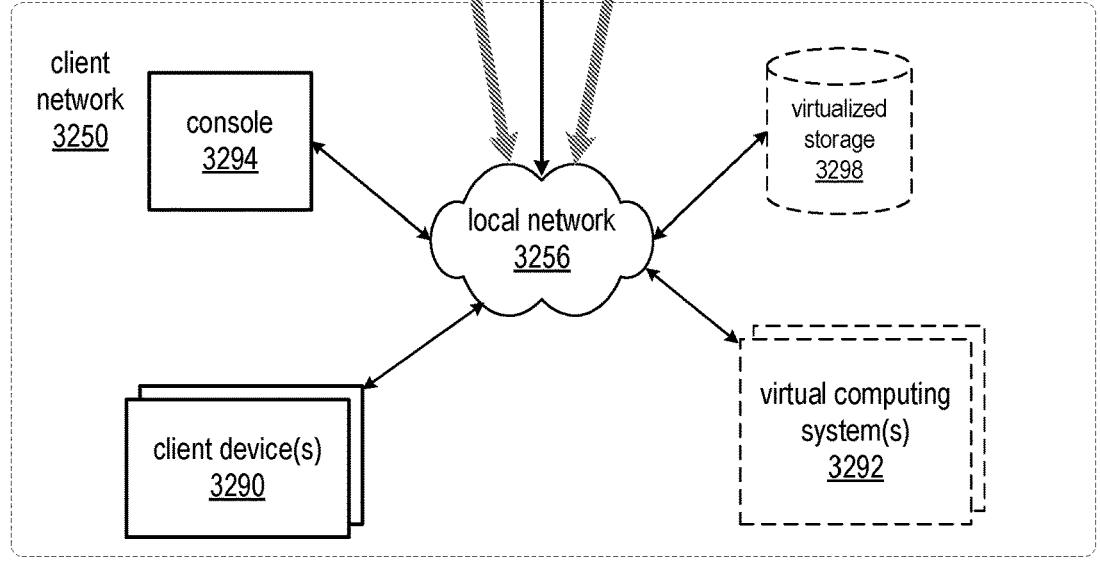

FIG. 15 is a block diagram of an example provider network that provides a storage virtualization service and a hardware virtualization service to clients, according to some embodiments. Hardware virtualization service 3220 provides multiple computation resources 3224 (e.g., VMs) to clients. The computation resources 3224 may, for example, be rented or leased to clients of the provider network 3200

(e.g., to a client that implements client network 3250). Each computation resource 3224 may be provided with one or more private IP addresses. Provider network 3200 may be configured to route packets from the private IP addresses of the computation resources 3224 to public Internet destinations, and from public Internet sources to the computation resources 3224.

Provider network 3200 may provide a client network 3250, for example coupled to intermediate network 3240 via local network 3256, the ability to implement virtual computing systems 3292 via hardware virtualization service 3220 coupled to intermediate network 3240 and to provider network 3200. In some embodiments, hardware virtualization service 3220 may provide one or more APIs 3202, for example a web services interface, via which a client network 3250 may access functionality provided by the hardware virtualization service 3220, for example via a console 3294. In some embodiments, at the provider network 3200, each virtual computing system 3292 at client network 3250 may correspond to a computation resource 3224 that is leased, rented, or otherwise provided to client network 3250.

From an instance of a virtual computing system 3292 and/or another client device 3290 or console 3294, the client may access the functionality of storage virtualization service 3210, for example via one or more APIs 3202, to access data from and store data to a virtual data store 3216 provided by the provider network 3200. In some embodiments, a virtualized data store gateway (not shown) may be provided at the client network 3250 that may locally cache at least some data, for example frequently accessed or critical data, and that may communicate with virtualized data store service 3210 via one or more communications channels to upload new or modified data from a local cache so that the primary store of data (virtualized data store 3216) is maintained. In some embodiments, a user, via a virtual computing system 3292 and/or on another client device 3290, may mount and access virtual data store 3216 volumes, which appear to the user as local virtualized storage 3298.

While not shown in FIG. 15, the virtualization service(s) may also be accessed from resource instances within the provider network 3200 via API(s) 3202. For example, a client, appliance service provider, or other entity may access a virtualization service from within a respective private network on the provider network 3200 via an API 3202 to request allocation of one or more resource instances within the private network or within another private network.

Figure 16:
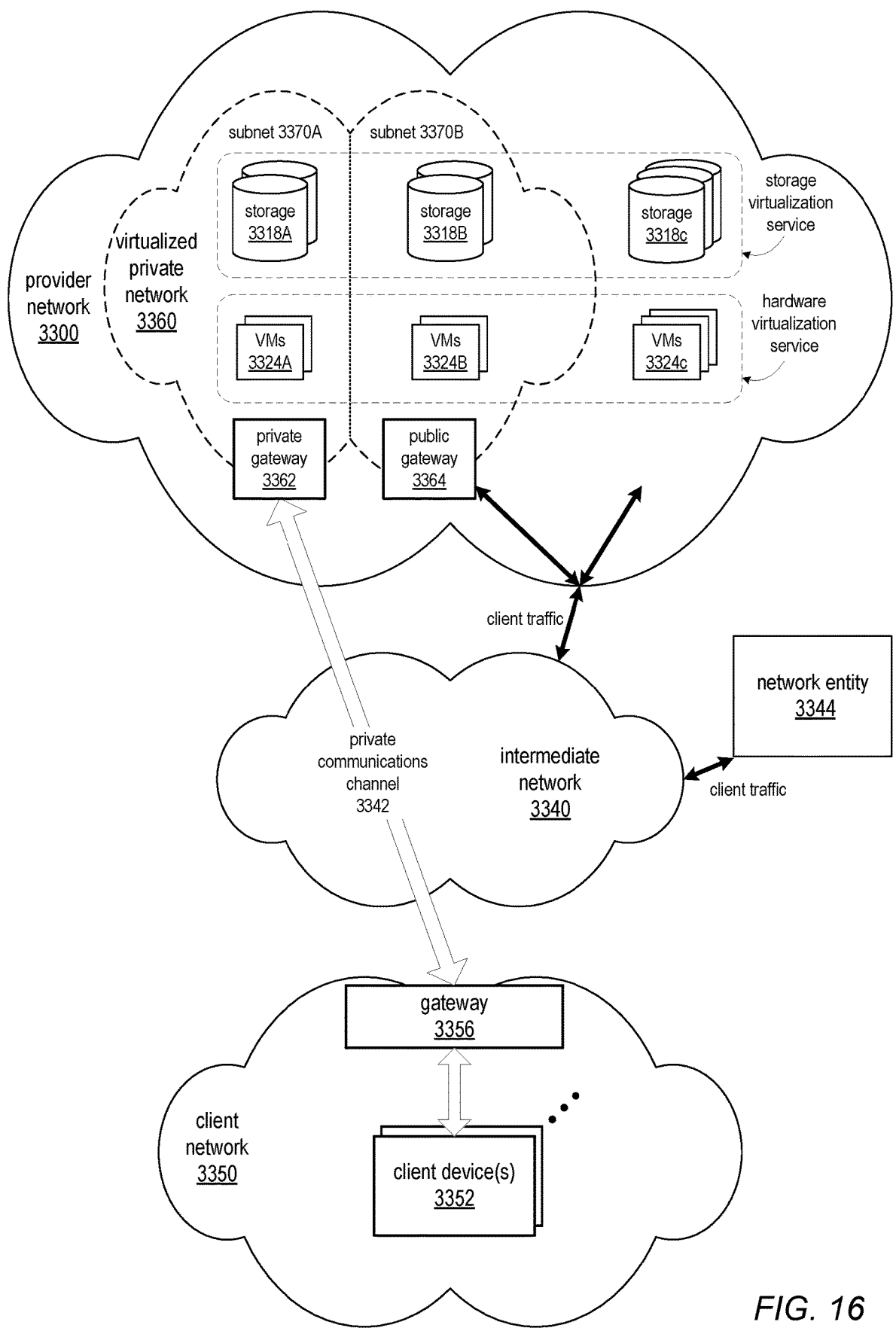
FIG. 16 illustrates an example provider network that provides virtualized private networks to at least some clients, according to some embodiments.

FIG. 16 illustrates an example provider network that provides private networks on the provider network to at least some clients, according to some embodiments. A client's virtualized private network 3360 on a provider network 3300, for example, enables a client to connect their existing infrastructure (e.g., devices 3352) on client network 3350 to a set of logically isolated resource instances (e.g., VMs 3324A and 3324B and storage 3318A and 3318B), and to extend management capabilities such as security services, firewalls, and intrusion detection systems to include their resource instances.

A client's virtualized private network 3360 may be connected to a client network 3350 via a private communications channel 3342. A private communications channel 3342 may, for example, be a tunnel implemented according to a network tunneling technology or some other technology over an intermediate network 3340. The intermediate network may, for example, be a shared network or a public network such as the Internet. Alternatively, a private communications channel 3342 may be implemented over a direct, dedicated connection between virtualized private network 3360 and client network 3350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 3360 for a client on provider network 3300, one or more resource instances (e.g., VMs 3324A and 3324B and storage 3318A and 3318B) may be allocated to the virtualized private network 3360. Note that other resource instances (e.g., storage 3318C and VMs 3324C) may remain available on the provider network 3300 for other client usage. A range of public IP addresses may also be allocated to the virtualized private network 3360. In addition, one or more networking devices (routers, switches, etc.) of the provider network 3300 may be allocated to the virtualized private network 3360. A private communications channel 3342 may be established between a private gateway 3362 at virtualized private network 3360 and a gateway 3356 at client network 3350.

In some embodiments, in addition to, or instead of, a private gateway 3362, virtualized private network 3360 may include a public gateway 3364 that enables resources within virtualized private network 3360 to communicate directly with entities (e.g., network entity 3344) via intermediate network 3340, and vice versa, instead of or in addition to via private communications channel 3342.

Virtualized private network 3360 may be, but is not necessarily, subdivided into two or more subnetworks, or subnets, 3370. For example, in implementations that include both a private gateway 3362 and a public gateway 3364, the private network may be subdivided into a subnet 3370A that includes resources (VMs 3324A and storage 3318A, in this example) reachable through private gateway 3362, and a subnet 3370B that includes resources (VMs 3324B and storage 3318B, in this example) reachable through public gateway 3364.

The client may assign particular client public IP addresses to particular resource instances in virtualized private network 3360. A network entity 3344 on intermediate network 3340 may then send traffic to a public IP address published by the client; the traffic is routed, by the provider network 3300, to the associated resource instance. Return traffic from the resource instance is routed, by the provider network 3300, back to the network entity 3344 over intermediate network 3340. Note that routing traffic between a resource instance and a network entity 3344 may require network address translation to translate between the public IP address and the private IP address of the resource instance.

Some embodiments may allow a client to remap public IP addresses in a client's virtualized private network 3360 as illustrated in FIG. 16 to devices on the client's external network 3350. When a packet is received (e.g., from network entity 3344), the network 3300 may determine that the destination IP address indicated by the packet has been remapped to an endpoint on external network 3350 and handle routing of the packet to the respective endpoint, either via private communications channel 3342 or via the intermediate network 3340. Response traffic may be routed from the endpoint to the network entity 3344 through the provider network 3300, or alternatively may be directly routed to the network entity 3344 by the client network 3350. From the perspective of the network entity 3344, it appears as if the network entity 3344 is communicating with the public IP address of the client on the provider network 3300. However, the network entity 3344 has actually communicated with the endpoint on client network 3350.

While FIG. 16 shows network entity 3344 on intermediate network 3340 and external to provider network 3300, a network entity may be an entity on provider network 3300. For example, one of the resource instances provided by provider network 3300 may be a network entity that sends traffic to a public IP address published by the client.

Illustrative System

In some embodiments, a system that implements a portion or all of the methods and apparatus for migrating virtual machines (VMs) in provider network environments as described herein may include a general-purpose computer system that includes or is configured to access one or more computer-accessible media, such as computer system 4000 illustrated in FIG. 17. In the illustrated embodiment, computer system 4000 includes one or more processors 4010 coupled to a system memory 4020 via an input/output (I/O) interface 4030. Computer system 4000 further includes a network interface 4040 coupled to I/O interface 4030.

In various embodiments, computer system 4000 may be a uniprocessor system including one processor 4010, or a multiprocessor system including several processors 4010 (e.g., two, four, eight, or another suitable number). Processors 4010 may be any suitable processors capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4020 may be configured to store instructions and data accessible by processor(s) 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for migrating VMs in provider network environments, are shown stored within system memory 4020 as code 4025 and data 4026.

In one embodiment, I/O interface 4030 may be configured to coordinate I/O traffic between processor 4010, system memory 4020, and any peripheral devices in the device, including network interface 4040 or other peripheral interfaces. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices 4060 attached to a network or networks 4050, such as other computer systems or devices as illustrated in FIGS. 1 through 16, for example. In various embodiments, network interface 4040 may support communication via any suitable wired or wireless general data networks, such as types of Ethernet network, for example. Additionally, network interface 4040 may support communication via telecommunications/telephony networks such as analog voice networks or digital fiber communications networks, via storage area networks such as Fibre Channel SANs, or via any other suitable type of network and/or protocol.

In some embodiments, system memory 4020 may be one embodiment of a computer-accessible medium configured to store program instructions and data as described above for FIGS. 1 through 16 for implementing embodiments of methods and apparatus for migrating VMs in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 4000 via I/O interface 4030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 4000 as system memory 4020 or another type of memory. Further, a computer-accessible medium may include transmission media or signals such as electrical, electromagnetic, or digital signals, conveyed via a communication medium such as a network and/or a wireless link, such as may be implemented via network interface 4040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a client network comprising:
a device that implements a server on the client network; and
a storage system;
a physical boot medium configured to be inserted in the device, wherein the boot medium stores program instructions for installing a migration appliance on the device upon a reboot of the device with the boot medium inserted in the device;
wherein the migration appliance is executable on a processor and memory of the device and configured to:
receive, via a network connection over an intermediate network, a request from a migration initiator on a provider network for a boot sector for an operating system of the server; and
responsive to the request received from the migration initiator on the provider network:
read the boot sector from a volume on the storage system that is logically attached to the server;
convert the boot sector read from the storage system, from a format used by the server to a format used by a virtual machine (VM) on a host device in the provider network; and
send the converted boot sector to the migration initiator via the network connection, wherein the migration initiator boots the VM on the host device in the provider network according to the converted boot sector,
wherein read the boot sector, convert of the boot sector, and send the converted boot sector are performed by the migration appliance at the device that implements the server for which the boot sector is requested.

2. The system as recited in claim 1, wherein the migration appliance is further configured to:
receive additional requests for blocks of data for the server from the migration initiator via the network connection;
read the requested blocks from one or more volumes on the storage system of the client network that are logically attached to the server;
convert the blocks to the format used by the VM on the provider network; and
send the converted blocks to the migration initiator via the network connection.

3. The system as recited in claim 2, wherein the migration initiator stores the converted blocks received from the migration appliance to one or more volumes on a storage subsystem of the provider network.

4. The system as recited in claim 3, wherein the migration appliance is further configured to:
receive a write request from the migration initiator for data indicated by a write operation by the VM to the one or more volumes in the storage subsystem; and
write the data indicated by the write operation to the one or more volumes on the client network.

5. The system as recited in claim 1, wherein the boot medium is one of a USB key, a CD, or a DVD.

6. The system as recited in claim 1, wherein the migration appliance is further configured to:
send, by the migration appliance, fingerprints of blocks of data for the server stored in one or more volumes on the client network in response to requests from the migration initiator executing on one or more devices on the provider network;
compare, by the migration initiator, the fingerprints received from the migration appliance to fingerprints of respective blocks of data in a duplicate volume stored on the provider network;
for at least one block:
determine, by the migration initiator, that the fingerprint for the block received from the migration appliance matches a fingerprint of a respective block in the duplicate volume; and
read, by the migration initiator, the respective block from the duplicate volume; and
for at least one other block:
determine, by the migration initiator, that the fingerprint for the block received from the migration appliance does not match the fingerprint of the respective block in the duplicate volume; and
send, by the migration initiator, a request to the migration appliance to obtain the respective block from the one or more volumes on the client network.

7. A method, comprising:
installing a migration appliance on a server in a client network from a physical boot medium inserted in the server;
responsive to a request received by the migration appliance from a migration initiator executing on one or more devices on a provider network:
reading, by the migration appliance, a boot sector of the server from a volume on a storage system of the client network that is logically attached to the server;
converting, by the migration appliance, the boot sector from a format used by the server to a format used by a virtual machine (VM) on a host device in the provider network; and
sending the converted boot sector to the provider network via a network connection over an intermediate network,
wherein reading the boot sector, converting the boot sector, and sending the converted boot sector to the provider network are performed at the server whose boot sector is being read, converted and sent.

8. The method as recited in claim 7, further comprising booting the VM on the host device in the provider network according to the converted boot sector.

9. The method as recited in claim 7, further comprising:
reading, by the migration appliance, blocks of data for the server from one or more volumes on the storage system of the client network that are logically attached to the server;
converting, by the migration appliance, the blocks to the format used by the VM on the provider network; and
sending, by the migration appliance, the converted blocks to the provider network via the network connection.

10. The method as recited in claim 9, further comprising storing the converted blocks to one or more volumes on a storage subsystem of the provider network.

11. The method as recited in claim 10, further comprising:
receiving, by the migration appliance, a write request from the migration initiator for data indicated by a write operation by the VM to the one or more volumes in the storage subsystem; and writing, by the migration appliance, the data indicated by the write operation to the one or more volumes on the client network.

12. The method as recited in claim 7, further comprising:

sending, by the migration appliance, fingerprints of blocks of data for the server stored in one or more volumes on the client network in response to requests from the migration initiator executing on one or more devices on the provider network;

comparing, by the migration initiator, the fingerprints received from the migration appliance to fingerprints of respective blocks of data in a duplicate volume stored on the provider network;

for at least one block:
   determining, by the migration initiator, that the fingerprint for the block received from the migration appliance matches a fingerprint of a respective block in the duplicate volume; and
   reading, by the migration initiator, the respective block from the duplicate volume; and for at least one other block:
   determining, by the migration initiator, that the fingerprint for the block received from the migration appliance does not match the fingerprint of the respective block in the duplicate volume; and
   sending, by the migration initiator, a request to the migration appliance to obtain the respective block from the one or more volumes on the client network.

13. The method as recited in claim 7, wherein the boot medium is one of a USB key, a CD, or a DVD.

14. The method as recited in claim 7, further comprising rebooting the server with the boot medium removed from the server to uninstall the migration appliance from the server.

15. One or more non-transitory computer-readable storage media storing program instructions that when executed on or across one or more processors in a client network implement a migration appliance at the client network and configured to:

responsive to a request received by the migration appliance from a migration initiator executing on one or more devices on a provider network:
   read a boot sector for an operating system of a server from a volume on a storage system of the client network that is logically attached to the server; and
   send the boot sector to the provider network via a network connection over an intermediate network, wherein a virtual machine (VM) is booted on a host device in the provider network according to the boot sector;

wherein the server is a physical device on the client network, and wherein the migration appliance is booted on the server from the storage media, and wherein read and send the boot sector to the provider network are performed at the server on the client network.

16. The one or more non-transitory computer-readable storage media as recited in claim 15, wherein the migration appliance is further configured to convert the boot sector to a format used by the VM on the provider network prior to sending the boot sector to the provider network.

17. The one or more non-transitory computer-readable storage media as recited in claim 15, wherein the migration appliance is further configured to:

read additional data for the server from one or more volumes on the storage system of the client network that are logically attached to the server; and send the additional data to the provider network via the network connection, wherein the additional data is stored to one or more volumes on a storage subsystem of the provider network.

18. The one or more non-transitory computer-readable storage media as recited in claim 17, wherein the data is stored in a first format on the one or more volumes on the client network and in a second format on the one or more volumes on the provider network, wherein the migration appliance is configured to convert the data from the first format to the second format prior to sending the data to the provider network.

19. The one or more non-transitory computer-readable storage media as recited in claim 15, wherein the migration appliance is further configured to:

receive a write request from the provider network for data indicated by a write operation by the VM to the one or more volumes in the storage subsystem; and write the data indicated by the write operation to the one or more volumes on the client network.

20. The one or more non-transitory computer-readable storage media as recited in claim 15, wherein the one or more storage media is one of a USB key, a CD, or a DVD.

* * * * *